US009665125B2

(12) United States Patent
Browning et al.

(10) Patent No.: US 9,665,125 B2
(45) Date of Patent: May 30, 2017

(54) MAGNETIC ATTACHMENT MECHANISM FOR AN ELECTRONIC DEVICE

(71) Applicant: Intel Corporation, Santa Clara, CA (US)

(72) Inventors: David W. Browning, Beaverton, OR (US); Jeremy Burr, Portland, OR (US); Russell S. Aoki, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 14/229,386

(22) Filed: Mar. 28, 2014

(65) Prior Publication Data

US 2015/0277491 A1    Oct. 1, 2015

(51) Int. Cl.
*G06F 1/16*   (2006.01)
*H01R 13/62*  (2006.01)

(52) U.S. Cl.
CPC .......... *G06F 1/1632* (2013.01); *G06F 1/1654* (2013.01); *G06F 1/1679* (2013.01); *H01R 13/6205* (2013.01)

(58) Field of Classification Search
CPC .... G06F 1/1632; G06F 1/1616; G06F 1/1654; G06F 1/1679; G06F 1/1669; H01L 2924/00; H01R 13/6205; H01R 2201/06
USPC ........................ 361/679.4–679.45, 725–727; 361/679.29–679.3, 679.17; 710/303, 8; 713/300, 340
See application file for complete search history.

(56) References Cited

U.S. PATENT DOCUMENTS

| 5,812,356 | A  | * | 9/1998  | O'Connor | G06F 1/1632 335/179 |
| 6,119,237 | A  | * | 9/2000  | Cho | G06F 1/1632 710/303 |
| 6,501,646 | B2 | * | 12/2002 | Suzuki | G06F 1/1632 312/223.1 |
| 8,780,546 | B2 | * | 7/2014  | Zhou | H01R 27/00 361/679.41 |
| 2004/0223293 | A1 | * | 11/2004 | Nakano | G06F 1/1632 361/679.43 |
| 2006/0069837 | A1 | * | 3/2006  | Zhang | G06F 1/1632 710/303 |
| 2006/0250764 | A1 | * | 11/2006 | Howarth | G06F 1/1632 361/679.41 |

(Continued)

*Primary Examiner* — Adrian S Wilson
*Assistant Examiner* — Abhishek Rathod
(74) *Attorney, Agent, or Firm* — Patent Capital Group

(57) ABSTRACT

Particular embodiments described herein provide for an electronic device, such as a notebook computer, laptop, or tablet that includes a circuit board coupled to a plurality of electronic components (which may include any type of components, elements, circuitry, etc.). One particular example implementation of a docking base comprises a base housing including at least one alignment pin disposed within the base housing. Each of the at least one alignment pin is configured to engage a corresponding alignment pin receptacle of a device housing of an electronic device. The base housing further includes an attachment mechanism coupled to the at least one first alignment pin, wherein the attachment mechanism is configured to cause the at least one first alignment pin to extend at least partially from the base housing when the device housing is within a predetermined proximity of the base housing.

18 Claims, 13 Drawing Sheets

(56) References Cited

U.S. PATENT DOCUMENTS

| | | | |
|---|---|---|---|
| 2009/0079201 A1* | 3/2009 | Escamilla | G06F 1/162 292/10 |
| 2011/0096512 A1* | 4/2011 | Klicpera | G06K 7/10881 361/747 |
| 2012/0021619 A1* | 1/2012 | Bilbrey | H01R 13/6205 439/39 |
| 2012/0190406 A1* | 7/2012 | Chen | G06F 1/1632 455/557 |
| 2013/0050934 A1* | 2/2013 | Zhou | G06F 1/1632 361/679.43 |
| 2014/0313665 A1* | 10/2014 | Delpier | G06F 1/1616 361/679.55 |

* cited by examiner

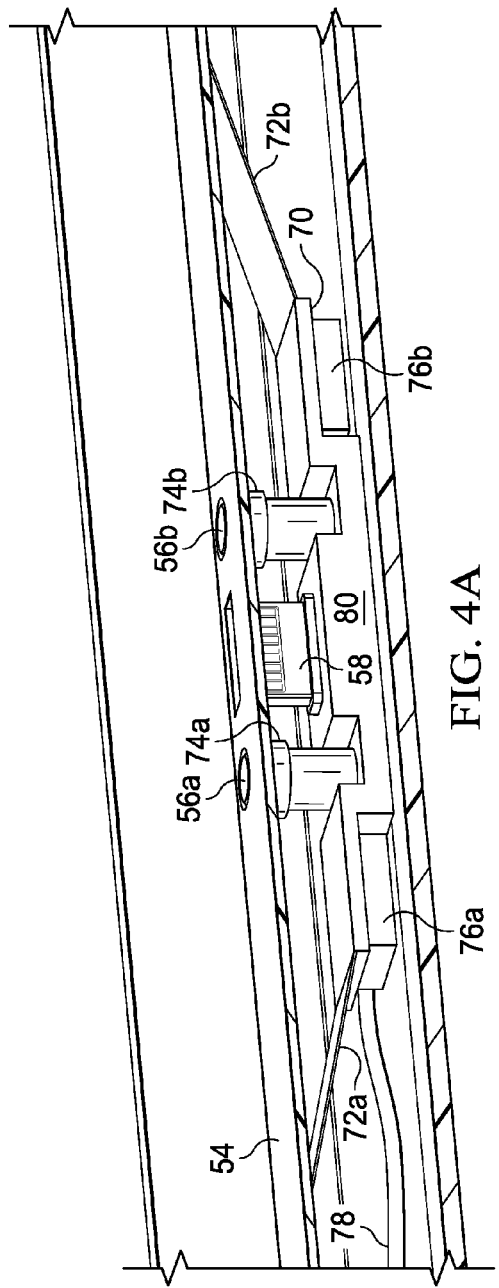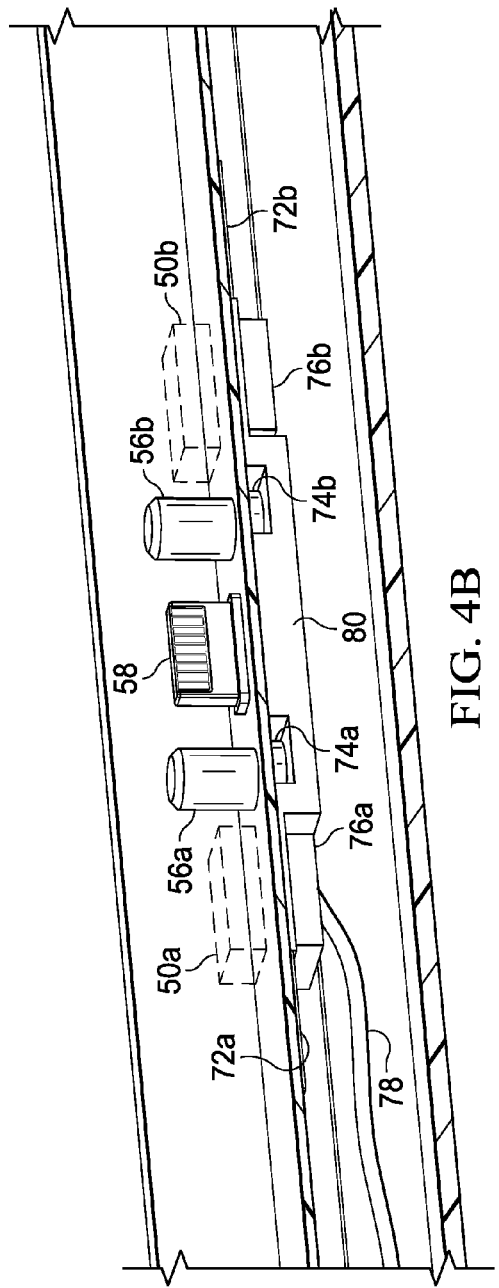

MAGNETIC ATTACHMENT MECHANISM FOR AN ELECTRONIC DEVICE

TECHNICAL FIELD

Embodiments described herein generally relate to a magnetic attachment mechanism for an electronic device.

BACKGROUND

End users have more electronic device choices than ever before. A number of prominent technological trends are currently afoot (e.g., more computing devices, duel displays, more detachable displays, etc.), and these trends are changing the electronic device landscape. One of the technological trends is an electronic device, such as a convertible or hybrid laptop, that has a convertible and/or detachable display and can essentially function as either a laptop or a tablet computer. To provide a compelling tablet experience, the user mechanically separates the display portion (or lid) from the base portion. However, existing mechanisms for separating the display portion and base portion are themselves a detriment to this experience. Currently existing mechanisms require alignment pins on one or both sides of the mechanical interface and those pins are both unsightly and potentially dangerous as they can catch on and damage items nearby the user such as clothing, etc.

BRIEF DESCRIPTION OF THE DRAWINGS

Embodiments are illustrated by way of example and not by way of limitation in the FIGURES of the accompanying drawings, in which like references indicate similar elements and in which:

FIG. 4A illustrates a simplified view of the extension/retraction mechanism in the retracted position;

FIG. 4B illustrates a simplified view of the extension/retraction mechanism in the extended position;

Figure 1A:
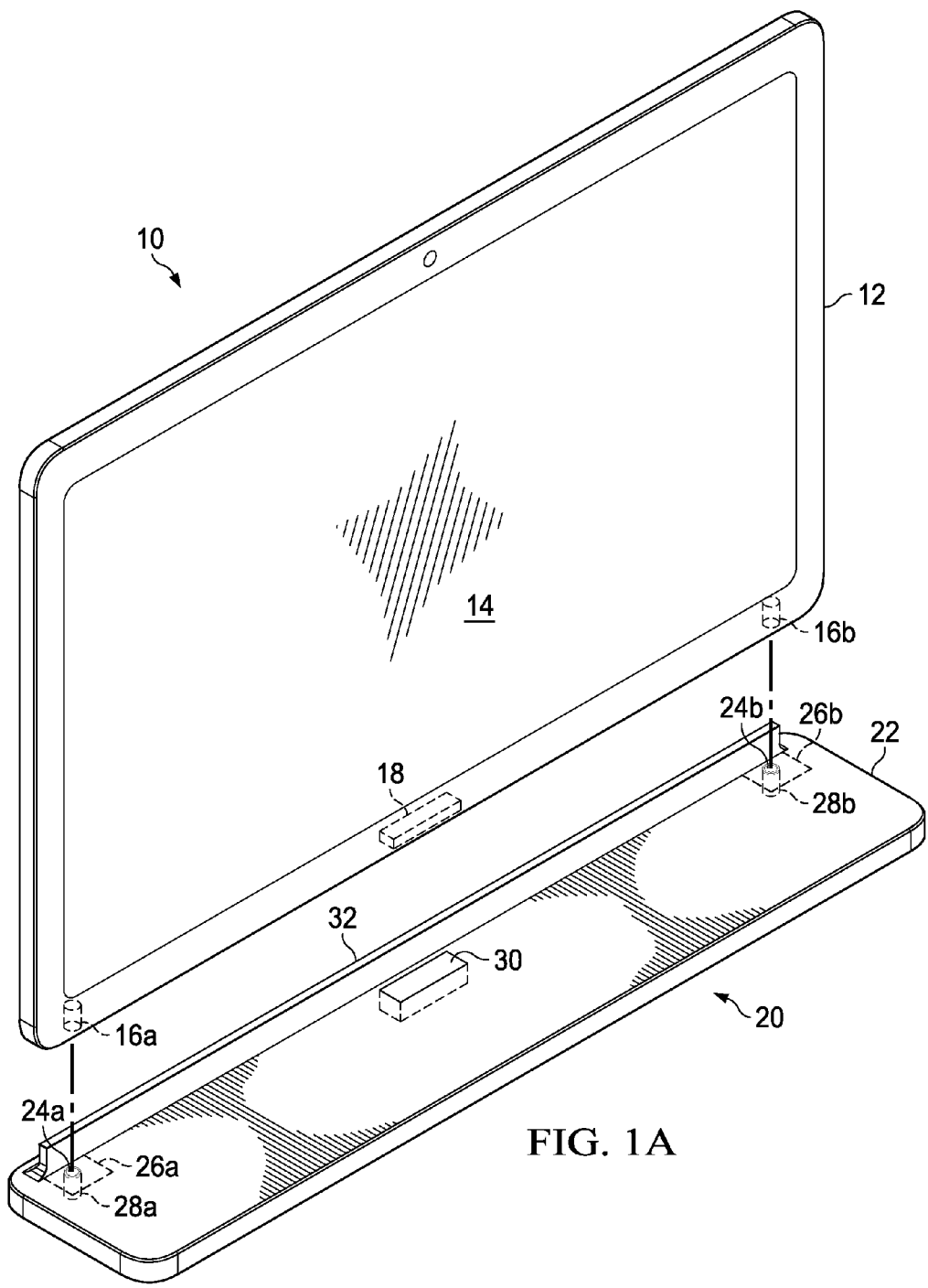
FIG. 1A is a simplified orthographic view illustrating an embodiment of an electronic device in a detached configuration from a docking base.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

Particular embodiments described herein provide for an electronic device, such as a notebook computer, laptop, or tablet that includes a circuit board coupled to a plurality of electronic components (which may include any type of components, elements, circuitry, etc.). One particular example implementation of a docking base comprises a base housing including at least one alignment pin disposed within the base housing. Each of the at least one alignment pin is configured to engage a corresponding alignment pin receptacle of a device housing of an electronic device. The base housing further includes an attachment mechanism coupled to the at least one first alignment pin, wherein the attachment mechanism is configured to cause the at least one first alignment pin to extend at least partially from the base housing when the device housing is within a predetermined proximity of the base housing.

In certain embodiments, the attachment mechanism is further configured to retract the at least one alignment pin within the base housing when the device housing is not within the predetermined proximity of the base housing. In certain embodiments, the device housing further includes at least one first magnetic element disposed proximate to at least one alignment pin receptacle, the at least one first magnetic element configured to magnetically attract the at least one alignment pin and move the at least one alignment pin into the extended position to engage with the corresponding alignment pin receptacle when the device housing is within a predetermined proximity of the base housing.

In certain embodiments, the base housing further includes at least one second magnetic element disposed proximate to the at least one alignment pin, the at least one second magnetic element configured to magnetically attract the at least one alignment pin to facilitate retracting of the at least one alignment pin within the base housing when the device housing is not within the predetermined proximity of the base housing.

In certain embodiments, the base housing further includes at least one movable magnetic element coupled to the at least one alignment pin; and a control module in communication with the at least one movable element, wherein the control module is configured to receive an input signal indicative of a current operating context of the electronic device, determine whether the at least one alignment pin is to be extended or retracted from the base housing based upon the current operating context, and cause the at least one movable magnetic element to either extend or retract the at least one alignment pin based upon the determined current operating context.

In certain embodiments, the control module is further configured to cause the at least one movable magnetic element to extend the at least one alignment pin from the base housing when the current operating context is indicative of a docking operation of the device housing with the base housing. In certain embodiments, the base housing further comprises at least one third magnetic element in communication with the control module, wherein the control module is further configured to cause the at least one third magnetic element to magnetically attract the device housing when the current operating context is indicative of the docking operation of the device housing with the base housing. In certain embodiments, the control module is further configured to cause the at least one movable magnetic element to retract the at least one alignment pin into the base housing when the current operating context is indicative of an undocking operation of the device housing from the base housing.

In certain embodiments, the docking base further includes at least one movable magnetic element coupled to the at least one alignment pin; a control module in communication with the at least one movable element; and a proximity sensor in communication with the control module, the proximity sensor configured to detect when the device housing is moved within a predetermined proximity to the base housing. In certain embodiments, the control module is configured to cause the at least one movable magnetic element to extend the at least one alignment pin from the base housing when the device housing is determined to be within the predetermined proximity to the base housing. In certain embodiments, the control module is configured to cause the at least one movable magnetic element to retract the at least one alignment pin into the base housing when the device housing is not determined to be within the predetermined proximity to the base housing.

In certain embodiments, the attachment mechanism includes: a support member coupled to the base housing, wherein the at least one alignment pin is coupled to the support member; and at least one fourth magnetic element coupled to the support member, wherein the at least one fourth magnetic element is configured to be magnetically attracted to the device housing to cause the at least one first alignment pin to extend at least partially from the base housing when the device housing is within the predetermined proximity of the base housing.

In certain embodiments, the docking base further includes a first electrical connector coupled to the support member, wherein the first electrical connector is configured to extend from the base housing and engage a second electrical connector of device housing when the device housing is within a predetermined proximity of the base housing. In certain embodiments, the support housing is coupled to the base housing by at least one spring, wherein the at least one spring is are configured to apply force to bias the support member in a retracted direction. In certain embodiments, the at least one spring is a leaf spring.

One particular example implementation of a system includes a device housing including at least one alignment pin receptacle, and a base housing. The base housing includes at least one alignment pin disposed within the base housing, each of the at least one alignment pin being configured to engage a corresponding alignment pin receptacle of a device housing, and an attachment mechanism coupled to the at least one first alignment pin, wherein the attachment mechanism is configured to cause the at least one first alignment pin to extend at least partially from the base housing when the device housing is within a predetermined proximity of the base housing.

One particular example implementation of at least one computer readable storage medium comprising instructions, wherein the instructions when executed by at least one processor cause the at least one processor to: receive an input signal indicative of a current operating context of an electronic device; determine whether at least one alignment pin of a base housing is to be extended or retracted from the base housing based upon the current operating context, each of the at least one alignment pin being configured to engage a corresponding alignment pin receptacle of a device housing of the electronic device; and cause at least one movable magnetic element within the base housing to either extend or retract the at least one alignment pin based upon the determined current operating context.

Example Embodiments

The following detailed description sets forth example embodiments of apparatuses, methods, and systems relating to a magnetic attachment mechanism for an electronic device. Features such as structure(s), function(s), and/or characteristic(s), for example, are described with reference to one embodiment as a matter of convenience; various embodiments may be implemented with any suitable one or more of the described features.

For purposes of illustrating certain example features of a magnetic attachment mechanism for an electronic device, the following foundational information may be viewed as a basis from which the present disclosure may be properly explained. One of the current technological trends is an electronic device, such as a convertible or hybrid laptop, that has a convertible and/or detachable display and can essentially function as either a laptop or a tablet computer. To provide a compelling tablet experience, the user mechanically separates the display portion (or lid) from the base portion. However, existing mechanisms for separating the display portion and base portion are themselves a detriment to this experience. Currently existing mechanisms require alignment pins on one or both sides of the mechanical interface and those pins are both unsightly and potentially dangerous as they can catch on and damage items nearby the user such as clothing, etc.

Various embodiments describe attachment mechanisms for an electronic device which reduces or eliminates problems caused by alignment pins by hiding the alignment pins when a display portion and a base portion are separated. In one or more embodiments, one or more alignment pin extension/retraction mechanisms use magnetic attraction to facilitate movement of the alignments pins from a hidden configuration to an extended configuration and/or from an extended configuration to a hidden configuration. In a particular embodiment, the alignment pin extension/retraction mechanism may be configured such that upon separation of the display portion and the base portion, the alignment pins are "pulled into" a chassis or housing of the electronic device. In another particular embodiment, the display portion may include magnets within a chassis thereof, and the alignment pins may be disposed within the base portion. When the display portion and the base portion are together, the magnets of the display portion may attract the alignment pins to assist in alignment and mechanical connection between the display portion and the base portion. However, upon separation, the alignment pins of the base portion into the base chassis or housing via gravity and are thereby 'hidden' from impacting the end user. In another particular embodiment, magnets that are weaker than those use in the display portion may be added to base portion which assist in pulling-down the alignment pins post-separation thereby hiding the alignment pins faster and with more certainty than relying solely on gravity.

In particular embodiments, after the two halves are mated, a latch may be used for robust mechanical retention. In various embodiments, the magnets may be physical permanent or semi-permanent magnets. In still other embodiments, permanent or semi-permanent magnets may be replaced and/or enhanced by providing current through magnetic coils to generate a magnetic attraction force to further facilitate movement of the alignment pins during a docking or undocking operation. In still other embodiments, a solenoid can be used to move the alignment pins during docking or undocking. In such embodiments, the magnetizing current can be applied until such time the display portion and base portion of the electronic device are docked and/or undocked.

In one or more embodiments, one or more proximity sensors can be utilized to determine whether to extend/retract the alignment pins by detecting whether the display portion and base portion are within proximity and a control module may control the alignment pin extension/retraction mechanisms to extend the alignment pins based upon the proximity. In particular embodiments, the proximity sensor can be course-grain such as a Near Field Communication (NFC) sensor, or fine-grain sensor such as hall effect sensor. In one or more embodiments, the proximity information received from the proximity sensor and/or feedback from the docked electrical connections can be used to determine the on/off state of the magnetizing current.

In one or more embodiments, a watchdog timer may be used to turn off the magnetizing current to limit power consumption when a given action is not carried through to completion. In particular embodiments, the magnetizing current may have multiple values, to vary the magnetic attraction. For example, more magnetic attraction may be required for extension of the alignment pins versus retraction of the alignment pins. In some embodiments, if a retaining latch is used, the magnets, and the magnetizing forces, can be used to passively retain the display portion and the base portion in place after the latch is released.

In other embodiments, another usage for the magnetizing force may be to supplement the magnets that mate the display portion and the base portion of the detachable electronic device. Similar to the alignment pin magnetizing force, the magnetizing current may have multiple values in order to vary the magnetic attraction. For example, more magnetic attraction may be required for attach of the display portion and base portion versus detach of the display portion because it may require more force to pull the display portion and base portion physically together, while less force may be required to the separate the display portion and the base portion.

In one or more embodiments, device usage context may be used to determine the need for attach/detach events. Context may be indicated by the detection of the occurrence of a particular event by the electronic device such as a physical switch event, a user's touch or touchless gesture, etc. In one or more embodiments, a control module may use the detection of the occurrence of a particular event to activate and/or deactivate the alignment pins movement by the one or more alignment pin extension/retraction mechanisms.

FIG. 1A is a simplified orthographic view illustrating an embodiment of an electronic device 10 in a detached configuration from a docking base 20. Electronic device 10 includes a device housing 12 having a display screen 14 disposed within a portion thereof. The device housing 12 includes a first alignment pin receptacle 16a and a second alignment pin receptacle 16b disposed at one or more edges of device housing 12. In the particular embodiment illustrated in FIG. 1A, first alignment pin receptacle 16a and second alignment pin receptacle 16b are disposed at a lower edge of device housing 12. In one or more embodiments, each of first alignment pin receptacle 16a and second alignment pin receptacle 16b includes a void having an opening to the exterior of device housing 12. Device housing 12 further includes first electrical connector interface 18 disposed on an outer surface thereof. In a particular embodiment, first electrical connector interface 18 is disposed on the lower edge of device housing 12.

Docking base 20 includes a base housing 22. Base housing 22 includes a first alignment pin 24a and a second alignment pin 24b configured to be alternately at least partially extended from base housing 22 during a docking of electronic device 10 with docking base 20, and retracted within base housing 22 during undocking of electronic device 10 with docking base 20. In the illustrated embodiment, first alignment pin 24a is configured to extend from and retract within base housing 20 through a first alignment pin hole 28a and second alignment pin 24b is configured to extend from and retract within base housing 20 through a second alignment pin hole 28b. Base housing 22 of docking base 20 further includes a first alignment pin extension/retraction mechanism 26a configured to extend first alignment pin 24a from base housing 20 when electronic device 10 is within proximity of docking base 20 during a docking of electronic device 10 with docking base 20 as will be further described herein. Base housing 22 of docking base 20 further includes a second alignment pin extension/retraction mechanism 26b configured to extend second alignment pin 24b from base housing 20 when electronic device 10 is within proximity of docking base 20 during the docking of electronic device 10 with docking base 20. During a docking procedure, first alignment pin 24a is extended at least partially into first alignment pin receptacle 16a, and second alignment pin 24b is extended at least partially into second alignment pin receptacle 16b to facilitate coupling of electronic device 10 with docking base 20.

First alignment pin extension/retraction mechanism 26a is further configured to retract first alignment pin 24a into base housing 20 when electronic device 10 is separated from docking base 20 during an undocking of electronic device 10 from docking base 20. Second alignment pin extension/retraction mechanism 26b is further configured to retract second alignment pin 24b into base housing 20 when electronic device 10 is separated from docking base 20 during an undocking of electronic device 10 from docking base 20.

Base housing 22 further includes a second electrical connector interface 30 disposed on an outer surface of base housing 20 and configured to interface with first electrical connector interface 18 during docking of electronic device 10 with docking station 20. Base housing 22 may further include a device support 32 extending along a portion of an outer surface thereof to provide support to electronic device 10 when electronic device 10 is docked with docking base 20.

In one or more embodiments, electronic device 10 is a tablet device, a notebook computer or laptop computer that is configured to be detachable from a base unit. In still other embodiments, electronic device 10 may be any suitable electronic device having a display such as a mobile device, Phablet™, a personal digital assistant (PDA), a smartphone, an audio system, a movie player of any type, a computer docking station, etc. In yet another embodiment, most of the electronics (e.g., processor, memory, etc.) for electronic device 10 reside in device housing 12. Display 14 can be a liquid crystal display (LCD), organic light-emitting diode (OLED), or some other type of display. Display screen 14 may also be a touchscreen display. In an embodiment, electronic device 10 may contain a camera, a microphone, and speakers. Docking base 20 may include any device which may be desirable to attach and detach from electronic device 10 such as a keyboard, docking station, device stand, etc.

Figure 1B:
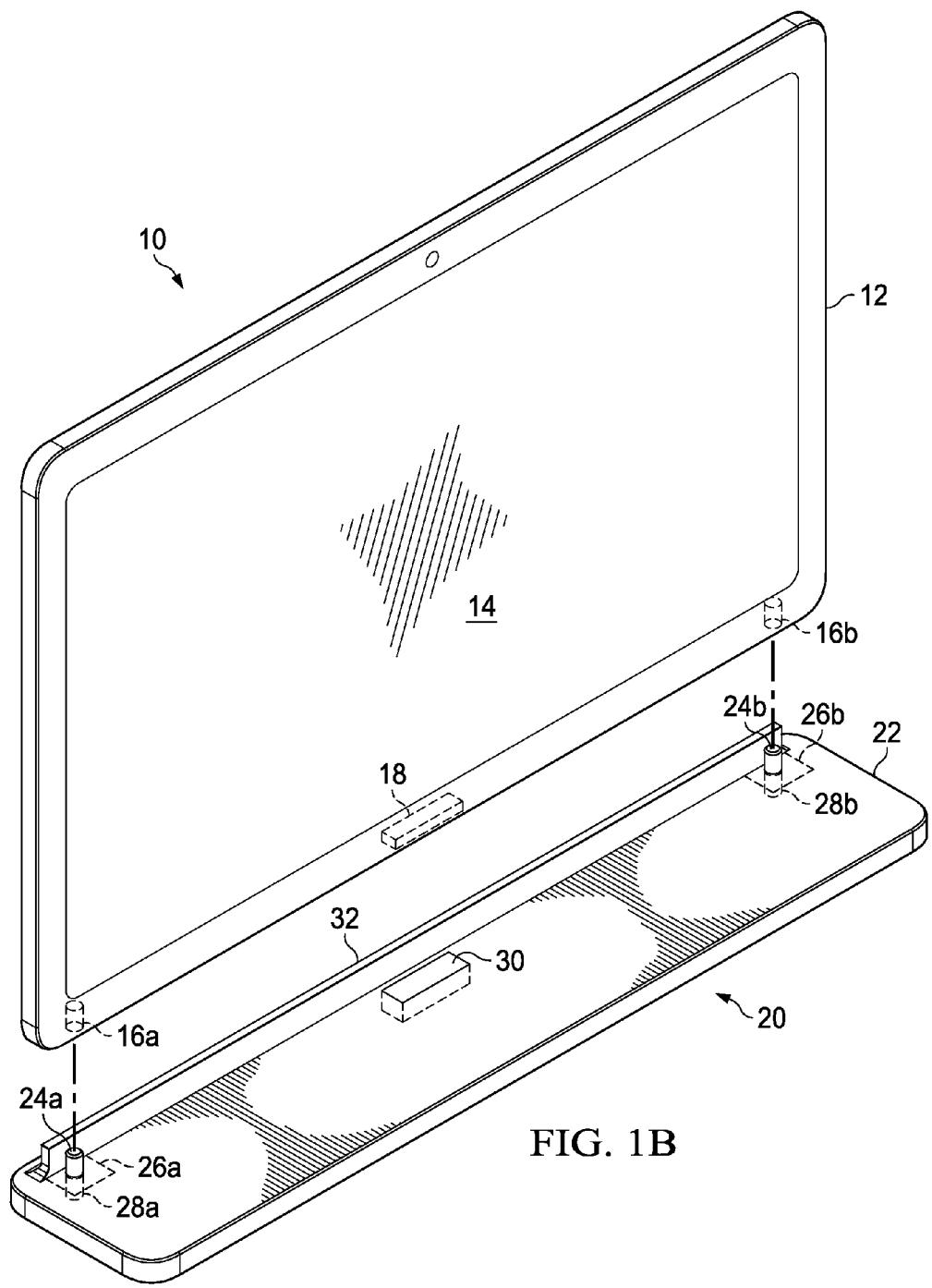
FIG. 1B is a simplified orthographic view illustrating an embodiment of the electronic device in the process of being attached to the docking base.

Referring now to FIG. 1B, FIG. 1B is a simplified orthographic view illustrating an embodiment of electronic device 10 in the process of being attached to docking base 20. In the embodiment of FIG. 1B, electronic device 10 has been moved to be within proximity of docking base 20. In response to electronic device 10 being within proximity of docking base 20, first alignment pin extension/retraction mechanism 26a extends a portion of first alignment pin 24a from base housing 22 through first alignment pin hole 28a and second alignment pin extension/retraction mechanism 26b extends a portion of second alignment pin 24b from base housing 22 through second alignment pin hole 28b. As will be further described herein, first alignment pin extension/retraction mechanism 26a and second alignment pin extension/retraction mechanism 26b include magnetic and/or electromagnetic mechanisms configured to extend first alignment pin 24a and second alignment pin 24b when electronic device 10 is moved to be within proximity of docking base 20. Further, first alignment pin extension/retraction mechanism 26a and second alignment pin extension/retraction mechanism 26b are configured to retract first alignment pin 24a and second alignment pin 24b into base housing 22 when electronic device 10 is separated from docking base 20.

Figure 1C:
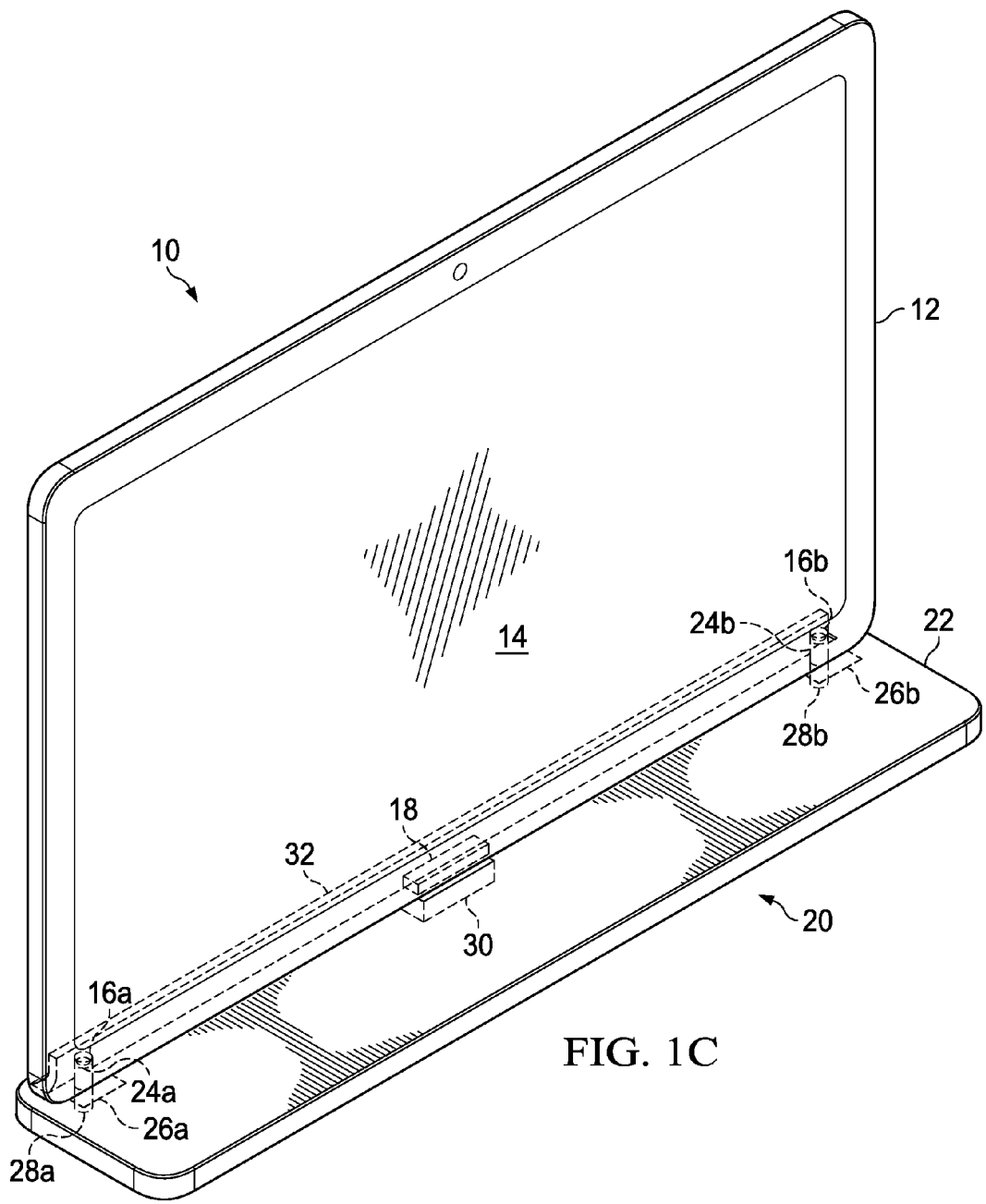
FIG. 1C is a simplified orthographic view illustrating an embodiment of the electronic device attached in a docked configuration to the docking base.

Referring now to FIG. 1C, FIG. 1C is a simplified orthographic view illustrating an embodiment of electronic device 10 attached in a docked configuration to docking base 20. In the embodiment of FIG. 1C, electronic device 10 is docked with docking base 20. A portion of first alignment pin 24a is extended into first alignment pin receptacle 16a of device housing 12, and a portion of second alignment pin 24n is extended into second alignment pin receptacle 16n of device housing 12. In the docked configuration, first electrical connector interface 18 is coupled to an in electrical connection with second electrical connector interface 30 to allow signals to be transmitted and received between one or more components of electronic device 10 and docking base 20. During the docked configuration, a back portion of device housing 12 is further supported by device support 32 of docking base 20.

Figure 2A:
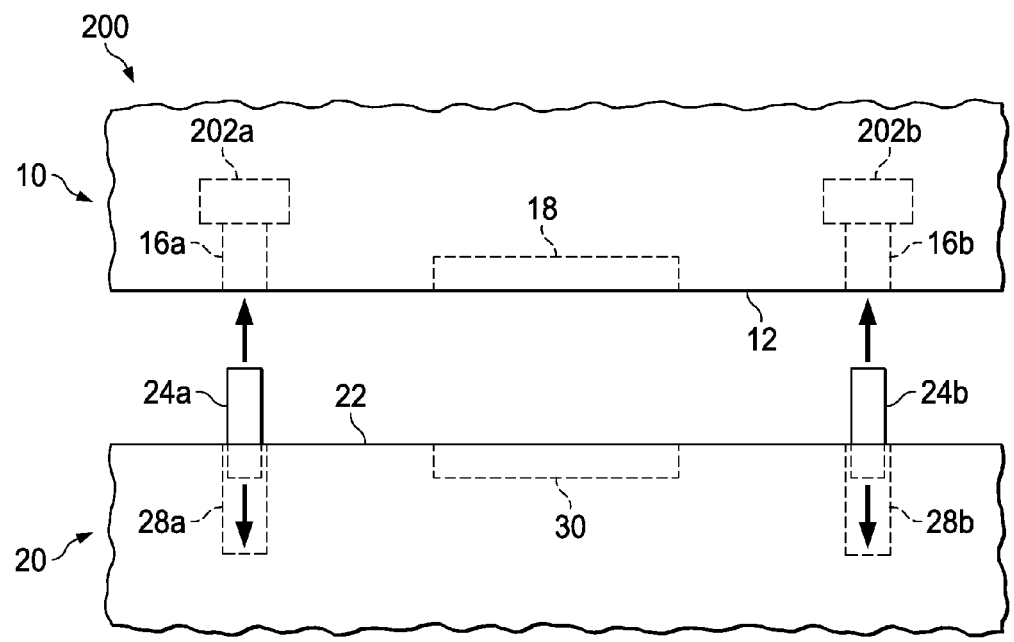
FIG. 2A is a simplified view of an embodiment of a magnetic attachment mechanism for the electronic device in accordance with one embodiment.

FIG. 2A is a simplified view of an embodiment of a magnetic attachment mechanism 200 for electronic device 10 in accordance with one embodiment. In the embodiment illustrated in FIG. 2A, device housing 12 of electronic device 10 includes first alignment pin receptacle 16a, second alignment pin receptacle 16b, a first magnetic element 202a and a second magnetic element 202b. Each of first magnetic element 202a and second magnetic element 202b are constructed of material having magnetic properties capable of exerting a magnetic force upon a magnetically attractive material. In accordance with various embodiments, first magnetic element 202a and second magnetic element 202b is disposed within or upon a surface of device housing 12. In other embodiments, one or more of first magnetic element 202a and second magnetic element 202b may include an electromagnet. In the particular embodiment illustrated in FIG. 2A, first magnetic element 202a is disposed proximate to first alignment pin receptacle 16a and second magnetic element 202a is disposed proximate to second alignment pin receptacle 16b. In the embodiment illustrate in FIG. 2A, first alignment pin 24a and second alignment pin 24b are constructed at least partially of a magnetically attractive material such as a ferrous material, magnetic material, or any other magnetically attractive material.

During a docking operation, as device housing 12 is moved within proximity of docking base 20, the magnetically attractive force provided by first magnetic element 202a attracts first alignment pin 28a and moves first alignment pin 28a into the extended position to engage with first alignment pin receptacle 16a. Similarly, the magnetically attractive force provided by second magnetic element 202b attracts second alignment pin 28b and moves second alignment pin 28n into the extended position to engage with second alignment pin receptacle 16a. Upon docking, first electrical connector interface 18 is in electrical connection with second electrical connector interface 30.

During an undocking operation, as device housing 12 is separated from docking base 20 the magnetically attractive force provided by first magnetic element 202a to first alignment pin 28a is overcome by the force of gravity acting upon first alignment pin 28a. As a result, first alignment pin 28a is dropped into the retracted position within base housing 22. Similarly, as device housing 12 is separated from docking base 20 the magnetically attractive force provided by second magnetic element 202b to second alignment pin 28b is overcome by the force of gravity acting upon second alignment pin 28n. As a result, second alignment pin 28b is dropped into the retracted position within base housing 22. Upon undocking, first electrical connector interface 18 is disconnected from second electrical connector interface 30.

Figure 2B:
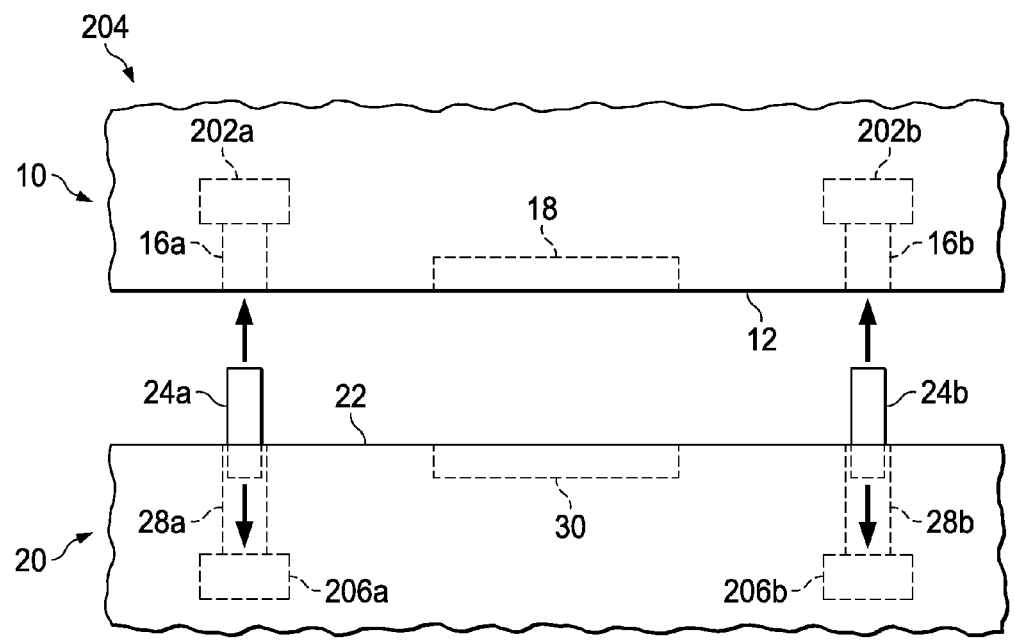
FIG. 2B is a simplified view of an embodiment of a magnetic attachment mechanism for the electronic device in accordance with another embodiment.

FIG. 2B is a simplified view of an embodiment of a magnetic attachment mechanism 204 for electronic device 10 in accordance with another embodiment. In the embodiment illustrated in FIG. 2B, device housing 12 of electronic device 10 includes first alignment pin receptacle 16a, second alignment pin receptacle 16b, and first magnetic element 202a and second magnetic element 202b. In accordance with various embodiments, first magnetic element 202a and second magnetic element 202b is disposed within or upon a surface of device housing 12. In the particular embodiment illustrated in FIG. 2B, first magnetic element 202a is disposed proximate to first alignment pin receptacle 16a and second magnetic element 202a is disposed proximate to second alignment pin receptacle 16b. In the embodiment illustrate in FIG. 2B, first alignment pin 24a and second alignment pin 24b are constructed at least partially of a magnetically attractive material such as a ferrous material, magnetic material, or any other magnetically attractive material.

In the embodiment illustrated in FIG. 2B, base housing 22 further includes a third magnetic element 206a and a fourth magnetic element 206b disposed within base housing 22. In the embodiment illustrated in FIG. 2B, third magnetic element 206a is disposed below or proximate to first alignment pin 24a within base housing 22 and fourth magnetic element 206b is disposed below or proximate to second alignment pin 24a within base housing 22. In one or more embodiments, third magnetic element 206a is configured to provide a weaker magnetically attractive force in an opposite direction to the magnetic attractive force provided to first alignment pin 24a by first magnetic element 202a when device housing 12 is docked with base housing 22. Similarly, fourth magnetic element 206b is configured to provide a weaker magnetic attractive force in an opposite direction to the magnetic attractive force provided to second alignment pin 24a by second magnetic element 206b when device housing 12 is docked with base housing 22. Each of third magnetic element 206a and fourth magnetic element 206b are constructed of material having magnetic properties capable of exerting a magnetic force upon a magnetically attractive material. In other embodiments, one or more of third magnetic element 206a and fourth magnetic element 206b may include an electromagnet.

During a docking operation, as device housing 12 is moved within proximity of docking base 20, the magnetically attractive force provided by first magnetic element 202a attracts first alignment pin 28a overcomes the magnetically attractive force provided by third magnetic element 206a and moves first alignment pin 28a into the extended position to engage with first alignment pin receptacle 16a. Similarly, the magnetically attractive force provided by second magnetic element 202b to second alignment pin 28b overcomes the magnetically attractive force provided by fourth magnetic element 206b and moves second alignment pin 28n into the extended position to engage with second alignment pin receptacle 16a. Upon docking, first electrical connector interface 18 is in electrical connection with second electrical connector interface 30.

During an undocking operation, as device housing 12 is separated from docking base 20 the magnetically attractive force provided by first magnetic element 202a to first alignment pin 28a is overcome by the magnetically attractive force from third magnetic element 206a and the force of gravity acting upon first alignment pin 28a. As a result, first alignment pin 28a is pulled into the retracted position within base housing 22. Similarly, as device housing 12 is separated from docking base 20 the magnetically attractive force provided by second magnetic element 202b to second alignment pin 28n is overcome by the magnetically attractive force from fourth magnetic element 206b and the force of gravity acting upon second alignment pin 28b. As a result, second alignment pin 28b is pulled into the retracted position within base housing 22. Upon undocking, first electrical connector interface 18 is disconnected from second electrical connector interface 30.

Figure 2C:
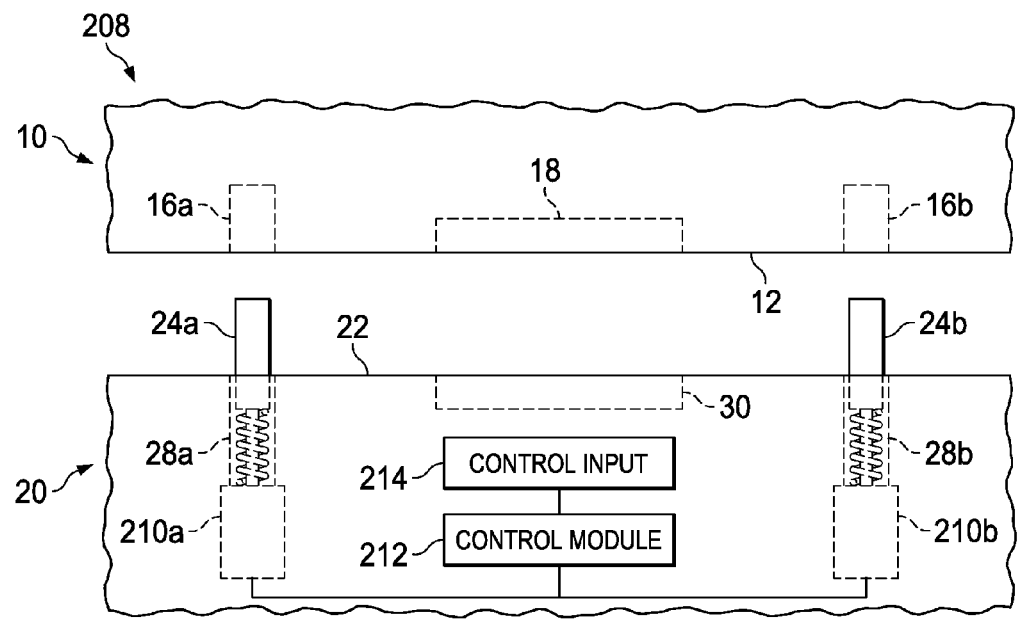
FIG. 2C is a simplified view of an embodiment of a magnetic attachment mechanism for the electronic device in accordance with another embodiment.

FIG. 2C is a simplified view of an embodiment of a magnetic attachment mechanism 208 for electronic device 10 in accordance with another embodiment. In the embodiment illustrated in FIG. 2C, device housing 12 of electronic device 10 includes first alignment pin receptacle 16a and second alignment pin receptacle 16b. Base housing 22 further includes a first solenoid 210a coupled to first alignment pin 24a and a second solenoid 210b coupled to second alignment pin 24b. First solenoid 210a and second solenoid 210b are each in communication with a control module 212. Although FIG. 2C is illustrated as using first solenoid 210a and second solenoid 210b, in other embodiments any suitable movable magnetic element may be used. Control module 212 is in further communication with a control input 214. In one or more embodiments, control input 214 is configured to receive an input signal indicative of a current operating context of electronic device 10 and provide the input signal to control module 212. Control module 212 is configured to determine whether first alignment pin 24a and second alignment pin 24b are to be extended or retracted based upon the current operating context. In accordance with one or more embodiments, first solenoid 210a is configured to selectively extend first alignment pin 24a from base housing 22 or retract first alignment pin 24a into base housing 22 in response to receiving a first control signal from control module 212. Similarly, second solenoid 210b is configured to selectively extend second alignment pin 24b from base housing 22 or retract second alignment pin 24b into base housing 22 in response to receiving a second control signal from control module 212.

During a docking operation, control module 212 receives an input signal from control input 214 indicative of the current context representative of an intended use of electronic device 10 in a docked mode of operation. In particular embodiments, the input signal may be indicative of selection of a switch, placement of electronic device 10 upon docking base 20, a touch interaction with display screen 14, a gesture by the user detected by electronic device 10 indicating a desire for the user to operate electronic device 10 in a docked configuration. In response to receiving the input signal, control module 212 sends a control signal to first solenoid 210a and second solenoid 210b to cause first solenoid 210a to extend first alignment pin 24a and second solenoid 210b to extend second alignment pin 24b. Upon extending of first alignment pin 24a and second alignment pin 24b, electronic device 10 may be docked with docking base 20. Upon docking, first electrical connector interface 18 is in electrical connection with second electrical connector interface 30.

During an undocking operation, control module 212 receives an input signal from control input 214 indicative of the current context representative of an intended use of electronic device 10 in an undocked mode of operation. In particular embodiments, the input signal may be indicative of selection of a switch, removal of electronic device 10 from docking base 20, a touch interaction with display screen 14, or a gesture by the user detected by electronic device 10 indicating a desire for the user to operate electronic device 10 in an undocked configuration. In response to receiving the input signal, control module 212 sends a control signal to first solenoid 210a and second solenoid 210b to cause first solenoid 210a to retract first alignment pin 24a and second solenoid 210b to retract second alignment pin 24b within base housing 212. Upon retracting of first alignment pin 24a and second alignment pin 24b, electronic device 10 may be undocked from docking base 20. Upon undocking, first electrical connector interface 18 is disconnected from second electrical connector interface 30.

In one or more embodiments, control module 212 may include a watchdog timer configured to turn off the magnetizing current to first solenoid 210a and second solenoid 210b to limit power consumption when a given action has not been performed within a predetermined time period. In a particular embodiment, if control module 212 receives an input signal from control input 214 indicative of a docking operation, control module 212 may cause first solenoid 210a and second solenoid 210b to extend first alignment pin 24a and second solenoid 210b. However, if control module 212 determines that the docking operation has not been completed within a predetermined time period, control module 212 may turn off current supplied to first solenoid 210a and second solenoid 210b thereby retracting first alignment pin 24a and second alignment pin 24b within base housing 22.

In one or more embodiments, the current supplied to first solenoid 210a and second solenoid 210b may be varied by control module 212 among multiple values in order to vary the force exerted upon first alignment pin 24a and second alignment pin 24b based upon whether the current operation is a docking operation or an undocking operation. For example, more force may be required for extension of first alignment pin 24a and second alignment pin 24b during a docking operation as compared to retraction of first alignment pin 24a and second alignment pin 24b during an undocking operation.

Figure 2D:
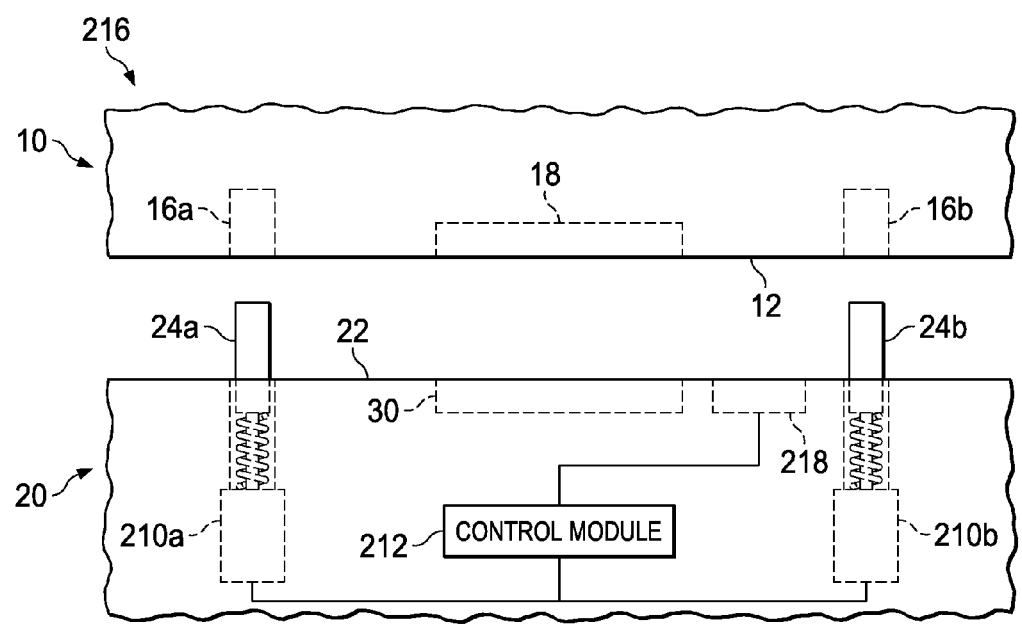
FIG. 2D is a simplified view of an embodiment of a magnetic attachment mechanism for the electronic device in accordance with another embodiment.

FIG. 2D is a simplified view of an embodiment of a magnetic attachment mechanism 216 for electronic device 10 in accordance with another embodiment. In the embodiment illustrated in FIG. 2D, device housing 12 of electronic device 10 includes first alignment pin receptacle 16a and second alignment pin receptacle 16b. Base housing 22 further includes a first solenoid 210a coupled to first alignment pin 24a and a second solenoid 210b coupled to second alignment pin 24b. First solenoid 210a and second solenoid 210b are each in communication with a control module 212. Base housing 22 further includes a proximity sensor 218 configured to detect when device housing 12 is moved within a predetermined proximity to base housing 22. In particular embodiments, proximity sensor 12 may include one or more of the proximity sensor can be course-grain such as a Near Field Communication (NFC) sensor, a fine-grain sensor such as hall effect sensor, a magnetic sensor, a capacitive sensor, inductive sensor, infrared sensor, or any other suitable proximity sensor. Control module 212 is in further communication with proximity sensor 218. In one or more embodiments, control input 214 is configured to receive a proximity signal indicative of whether device housing 12 has been brought to within proximity of base housing 22.

Control module 212 is configured to determine whether first alignment pin 24a and second alignment pin 24b are to be extended based upon the proximity signal received from proximity sensor 218. In accordance with one or more embodiments, first solenoid 210a is configured to selectively extend first alignment pin 24a from base housing 22 or retract first alignment pin 24a into base housing 22 in response to receiving a first control signal from control module 212. Similarly, second solenoid 210b is configured to selectively extend second alignment pin 24b from base housing 22 or retract second alignment pin 24b into base housing 22 in response to receiving a second control signal from control module 212.

During a docking operation, control module 212 receives a proximity signal from proximity sensor 218 indicative of device housing 12 being determined to be within proximity of base housing 22. In response to receiving the proximity signal, control module 212 sends a control signal to first solenoid 210a and second solenoid 210b to cause first solenoid 210a to extend first alignment pin 24a and second solenoid 210b to extend second alignment pin 24b. Upon extending of first alignment pin 24a and second alignment pin 24b, electronic device 10 may be docked with docking base 20. Upon docking, first electrical connector interface 18 is in electrical connection with second electrical connector interface 30.

During an undocking operation, control module 212 receives a proximity input signal from proximity sensor 218 indicative of device housing 12 not being determined to be within proximity of base housing 22. In response to receiving the proximity signal, control module 212 sends a control signal to first solenoid 210a and second solenoid 210b to cause first solenoid 210a to retract first alignment pin 24a and second solenoid 210b to retract second alignment pin 24b within base housing 212. Upon retracting of first alignment pin 24a and second alignment pin 24b, electronic device 10 may be undocked from docking base 20. Upon undocking, first electrical connector interface 18 is disconnected from second electrical connector interface 30.

Figure 2E:
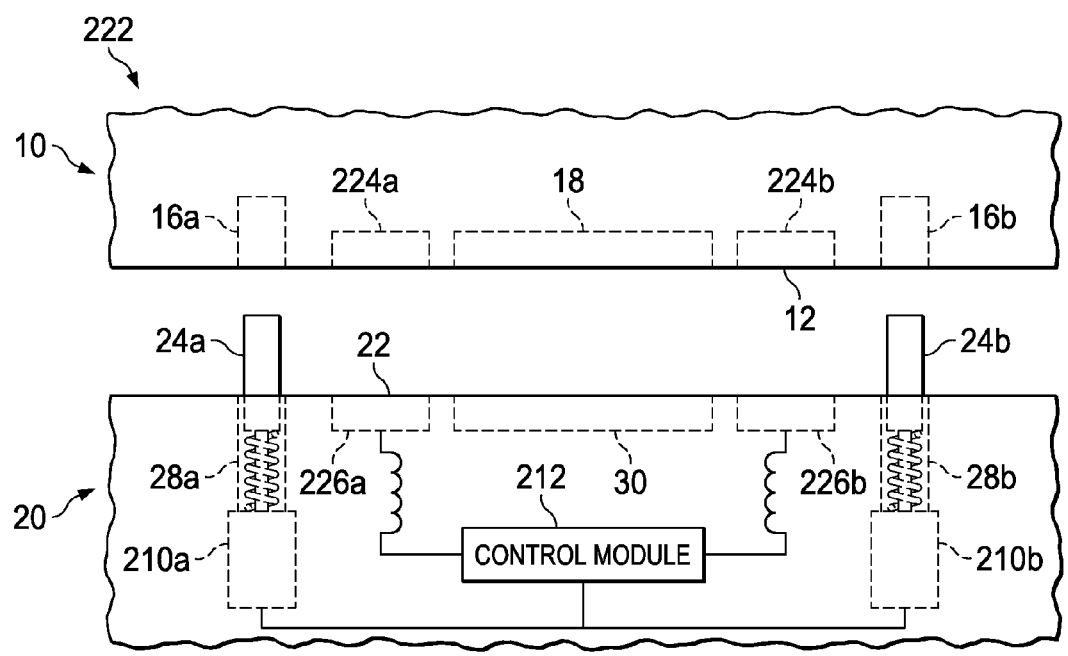
FIG. 2E is a simplified view of an embodiment of a magnetic attachment mechanism 222 for electronic device 10 in accordance with another embodiment.

FIG. 2E is a simplified view of an embodiment of a magnetic attachment mechanism 222 for electronic device 10 in accordance with another embodiment. In the embodiment illustrated in FIG. 2C, device housing 12 of electronic device 10 includes first alignment pin receptacle 16a, second alignment pin receptacle 16b, a fifth magnetic element 224a and a sixth magnetic element 224. Each of fifth magnetic element 224a and second magnetic element 224b are constructed of material having magnetic properties capable of exerting a magnetic force upon a magnetically attractive material. In accordance with various embodiments, fifth magnetic element 224a and second magnetic element 224b is disposed within or upon a surface of device housing 12. In other embodiments, one or more of fifth magnetic element 224a and second magnetic element 224b may include an electromagnet.

Base housing 22 further includes first solenoid 210a coupled to first alignment pin 24a and second solenoid 210b coupled to second alignment pin 24b. First solenoid 210a and second solenoid 210b are each in communication with control module 212. Base housing 22 further includes a first electromagnet 226a and a second electromagnet 226b. Each of first electromagnet 226a and second electromagnet 226b is in communication with control module 212. First electromagnet 226a is configured to attract fifth magnetic element 224a and second electromagnet 226a is configured to attract sixth magnetic element 224b to provide a supplemental magnetic force to assist in docking of device housing 12 with base housing 22.

During a docking operation, control module 212 sends a control signal to first solenoid 210a and second solenoid 210b to cause first solenoid 210a to extend first alignment pin 24a and second solenoid 210b to extend second alignment pin 24b. Upon extending of first alignment pin 24a and second alignment pin 24b, electronic device 10 may be docked with docking base 20. In addition, control module 212 energizes first electromagnet 226a and a second electromagnet 226b to provide a magnetic attractive force with fifth magnetic element 224a and second magnetic element 224b, respectively, to assist in docking of device housing 12 with base housing 22. Upon docking, first electrical connector interface 18 is in electrical connection with second electrical connector interface 30.

During an undocking operation, control module 212 sends a control signal to first solenoid 210a and second solenoid 210b to cause first solenoid 210a to retract first alignment pin 24a and second solenoid 210b to retract second alignment pin 24b within base housing 212. In addition, control module 212 may turn off first electromagnet 226a and a second electromagnet 226b to remove the magnetic attractive force with fifth magnetic element 224a and second magnetic element 224b. Upon retracting of first alignment pin 24a and second alignment pin 24b, electronic device 10 may be undocked from docking base 20. Upon undocking, first electrical connector interface 18 is disconnected from second electrical connector interface 30.

Another embodiment of a magnetic attachment mechanism for an electronic device includes one or more alignment pins and an electrical connector that are each retractable in a base portion when the electronic device is being operated in an undocked configuration or extended from the base portion when the electronic device is being operated in an undocked configuration.

Systems that mechanically and electrically "dock" to one another are a growing segment within the PC/tablet market. Existing technologies often use a USB3.0 Type C connector as an electrical standard between the two devices. However, the USB Type C connector presents several challenges due to the plug design necessary to implement the connector in a PC/tablet style device. Many of the connectors on the market today are prone to damage during installation of the tablet to the docking station as well as when the user is transporting the docking station without the tablet attached. The connector is exposed to external forces that make it prone to damage. In addition, consumers tend to react unfavorably to devices having protruding components off of the docking station.

Various embodiments provided herein provide a mechanism that may hide and protect the connector/plug between an electronic device and a docking station. In one or more embodiments, extension/retraction mechanism is configured to retract the plug into the base of the docking station. When the connector/plug is "hidden", it is protected from damage when the docking station is not in use as well as provide a clean interface with no protruding parts. In particular embodiments one or more magnets are configured to automatically active extension of the connector/plug out of the docking station when the electronic device is moved within a predetermined distance of the docking station. In one or more embodiments, the one or more magnets may also provide enough magnetic attraction to automatically connect the connector/plug to the electronic device.

Figure 3A:
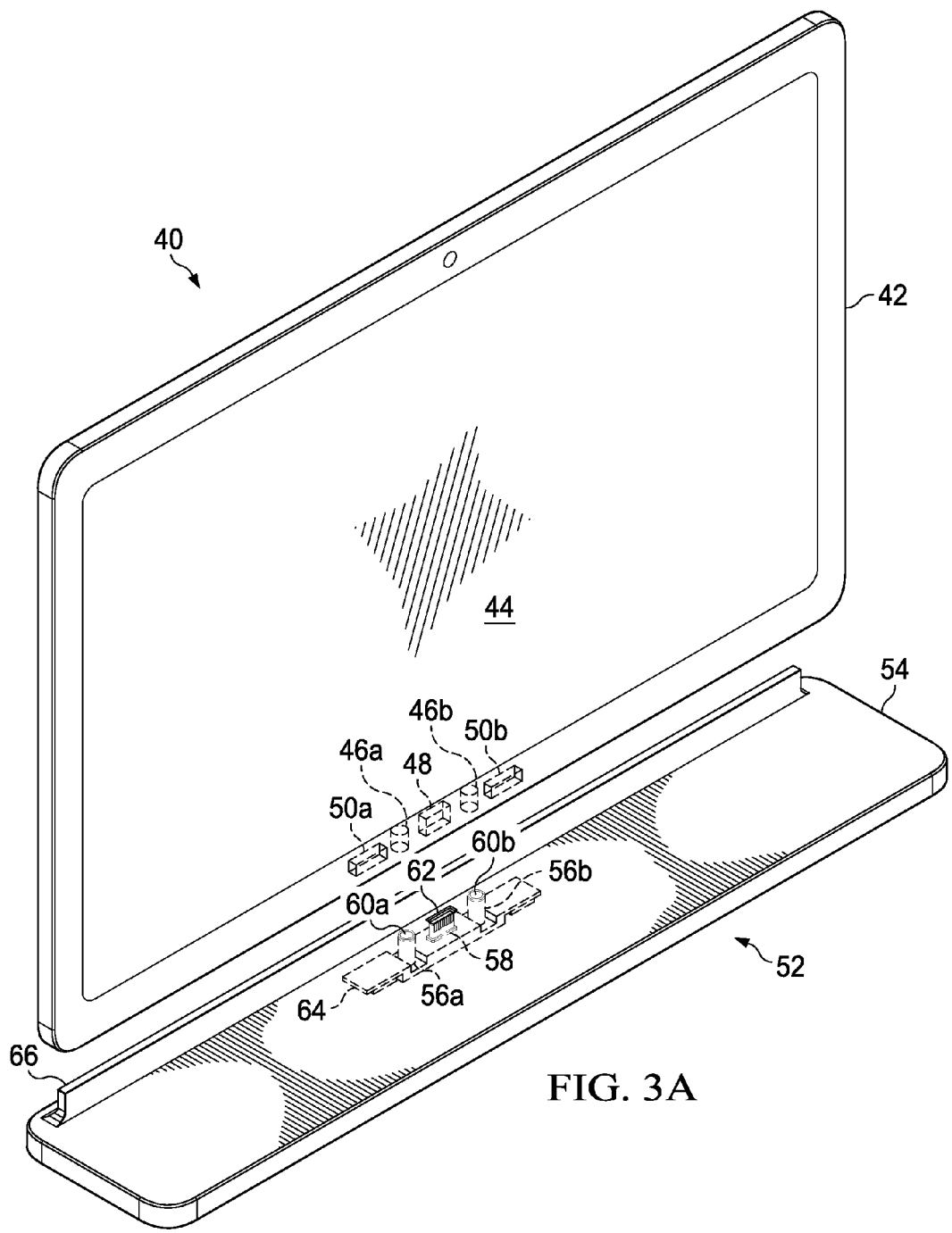
FIG. 3A is a simplified orthographic view illustrating an embodiment of an electronic device in a detached configuration from a docking base.

FIG. 3A is a simplified orthographic view illustrating an embodiment of an electronic device 40 in a detached configuration from a docking base 52. Electronic device 40 includes a device housing 42 having a display screen 44 disposed within a portion thereof. The device housing 42 includes a first alignment pin receptacle 46a, a second alignment pin receptacle 46b, and a first electrical connector 48 disposed at one or more edges of device housing 42. In the particular embodiment illustrated in FIG. 3A, first alignment pin receptacle 46a, second alignment pin receptacle 46b, and first electrical connector 48 are disposed at a lower edge of device housing 42. In one or more embodiments, each of first alignment pin receptacle 46a, second alignment pin receptacle 46b, and first electrical connector 48 includes a void having an opening to the exterior of device housing 42. Device housing 42 further includes a first magnetic element 50a disposed adjacent to first alignment pin receptacle 46a and a second magnetic element 50b disposed adjacent to second alignment pin receptacle 46b.

Docking base 52 includes a base housing 54. Base housing 54 includes a first alignment pin 56a, a second alignment pin 56b, and a second electrical connector 58 configured to be alternately at least partially extended from base housing 5 during a docking of electronic device 40 with docking base 52, and retracted within base housing 54 during undocking of electronic device 40 with docking base 52. In the illustrated embodiment, first alignment pin 56a is configured to extend from and retract within base housing 54 through a first alignment pin hole 60a and second alignment pin 56b is configured to extend from and retract within base housing 54 through a second alignment pin hole 60b. Second electrical connector 58 is configured to extend from and retract within base housing 54 through a slot 62. Base housing 54 of docking base 52 further includes an extension/retraction mechanism 64 configured to extend first alignment pin 56a, second alignment pin 56b, and second electrical connector 58 from base housing 52 when electronic device 40 is within proximity of docking base 52 during a docking of electronic device 40 with docking base 52 as will be further described herein.

During a docking procedure, first alignment pin 56a is extended at least partially into first alignment pin receptacle 46a, second alignment pin 56b is extended at least partially into second alignment pin receptacle 46b, and second electrical connector 58 is configured to extend into and electrically couple with first electrical connector 48 to facilitate coupling of electronic device 40 with docking base 52. In one or more embodiments, one or more of first magnetic element 50a and second magnetic element 50b are configured to magnetically attract extension/retraction mechanism 64 to extend first alignment pin 56a, second alignment pin 56b, and second electrical connector 58 when device housing 42 is brought within proximity of base housing 54. In still other embodiments, first magnetic element 50a and second magnetic element 50b may be replaced by any other magnetically attractive material such as steel or another metal.

Extension/retraction mechanism 64 is further configured to retract first alignment pin 56a, second alignment pin 56b, and second electrical connector 58 into base housing 54 when electronic device 40 is separated from docking base 52 during an undocking of electronic device 40 from docking base 52. In one or more embodiments, base housing 54 may further include a device support 66 extending along a portion of an outer surface thereof to provide support to electronic device 40 when electronic device 40 is docked with docking base 52.

Figure 3B:
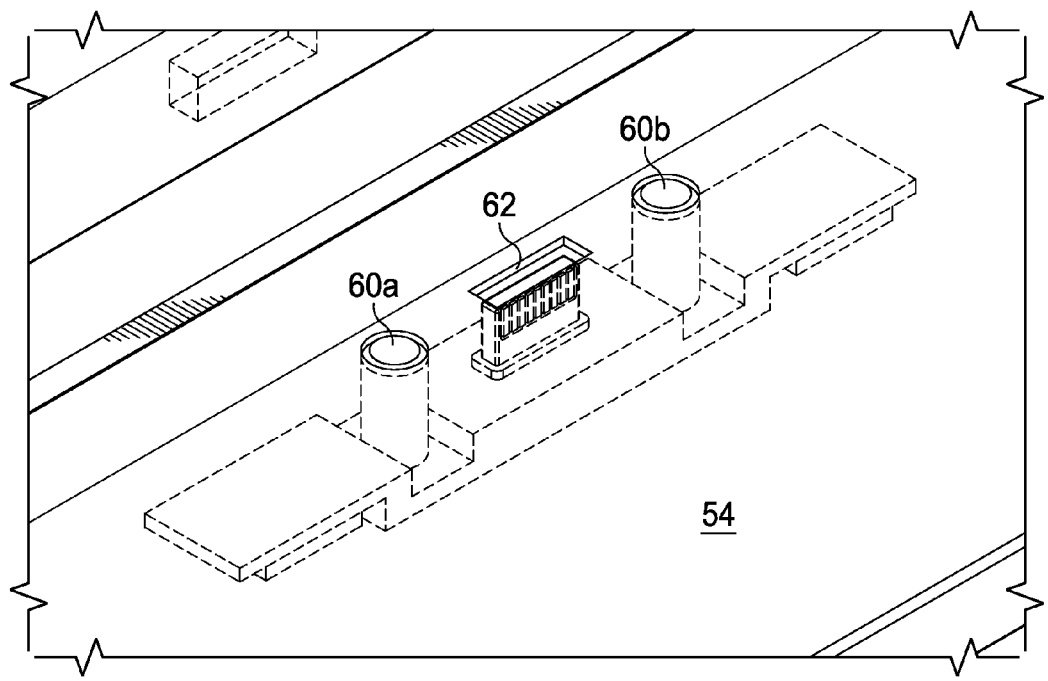
FIGS. 3B-3C illustrate simplified close-up views of the base housing of the docking base.
Figure 3C:
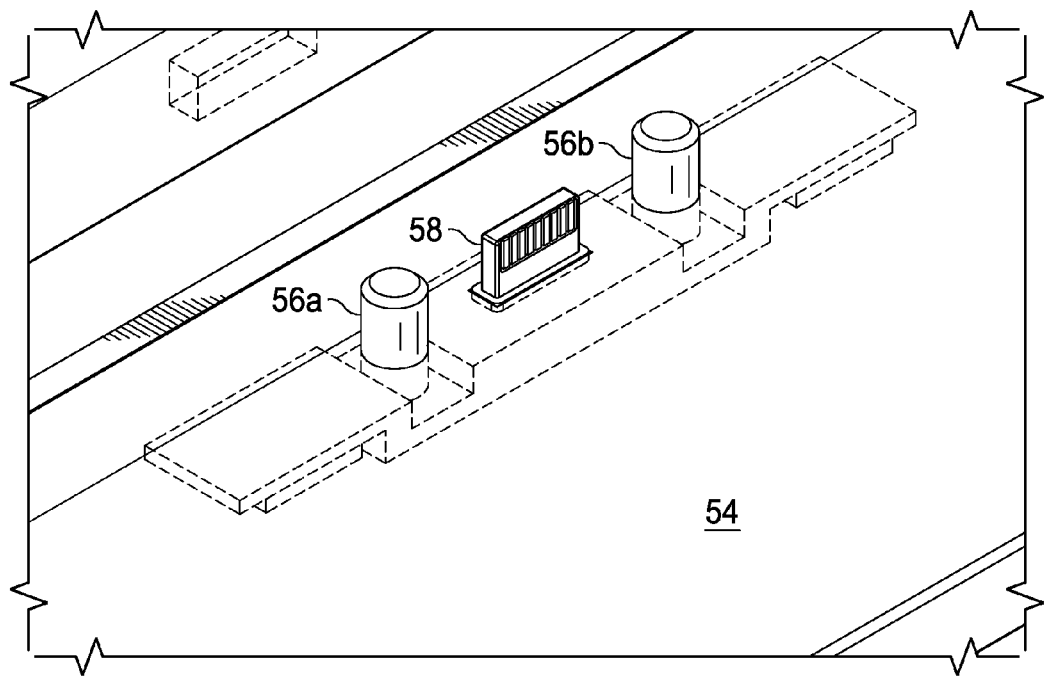

FIG. 3B illustrates a simplified close-up view of base housing 54 in which first alignment pin 56a, second alignment pin 56b, and second electrical connector 58 are retracted within base housing 54. FIG. 3C illustrates a simplified close-up view of base housing 54 in which first alignment pin 56a, second alignment pin 56b, and second electrical connector 58 are at least partially extended from base housing 54.

In one or more embodiments, electronic device 40 is a tablet device, a notebook computer or laptop computer that is configured to be detachable from a base unit. In still other embodiments, electronic device 40 may be any suitable electronic device having a display such as a mobile device, Phablet™, a personal digital assistant (PDA), a smartphone, an audio system, a movie player of any type, a computer docking station, etc. In yet another embodiment, most of the electronics (e.g., processor, memory, etc.) for electronic device 40 reside in device housing 42. Display screen 44 can be a liquid crystal display (LCD), organic light-emitting diode (OLED), or some other type of display. Display screen 44 may also be a touchscreen display. In an embodiment, electronic device 40 may contain a camera, a microphone, and speakers. Docking base 52 may include any device which may be desirable to attach and detach from electronic device 40 such as a keyboard, docking station, device stand, battery module, etc.

FIGS. 4A-4B are a simplified view of an embodiment of a extension/retraction mechanism 64 for electronic device 40 in accordance with one embodiment. The extension/retraction mechanism 64 includes a support member 70 within base housing 54. Support member 70 is coupled to base housing 54 at a first end via a first leaf spring 72a and at a second end via a second leaf spring 72b. In one or more embodiments, first leaf spring 72a and second leaf spring 72b are configured to apply force to bias support member 70 in a retracted direction toward the interior of base housing 54. In still other embodiments, first leaf spring 72a and second leaf spring 72b may be replaced with any other suitable biasing mechanism such as one or more coil springs. First alignment pin 56a, second alignment pin 56b, and second electrical connector 58 are coupled to and supported by a top surface of support member 70. Support member 70 is further coupled to base housing 54 via a first linear bearing 74a and a second linear bearing 74b. First linear bearing 74a and second linear bearing 74b are configured to allow support member 70 to slide upward within base housing 54 during extending of first alignment pin 56a, second alignment pin 56b, and second electrical connector 58 during a docking procedure, and allow support member 70 to slide downward within base housing 54 during retraction of first alignment pin 56a, second alignment pin 56b, and second electrical connector 58 during an undocking procedure.

Support member 70 further includes a third magnetic element 76a disposed at the first end and a fourth magnetic element 76b disposed at the second end. Although third magnetic element 76a and fourth magnetic element 76b are illustrated as using permanent or semi-permanent magnets, in other embodiments one or more of third magnetic element 76a and fourth magnetic element 76b may be replaced by an electromagnetic or a solenoid such as previously described herein. An electrical cable 78 is coupled to second electrical connector 58 to provide an electrical connection between second electrical connector 58 and one or more components of docking base 52. Support member 70 may further include a support block 80 disposed below second electrical connector 58 to provide robust support for second electrical connector 58 during docking operations.

FIG. 4A illustrates a simplified view of the extension/retraction mechanism in the retracted position. In the retracted position, first leaf spring 72a and second leaf spring 72b apply sufficient downward force on support member 70 to hold first alignment pin 56a, second alignment pin 56b, and second electrical connector 58 within base housing 54.

FIG. 4B illustrates a simplified view of the extension/retraction mechanism in the extended position. In the extended position, first magnetic element 50a and second magnetic element 50b of device housing 42 (not shown) are brought within proximity of third magnetic element 76a and fourth magnetic element 76b, respectively. First magnetic element 50a and third magnetic element 76a exert an attractive magnetic force therebetween, and second magnetic element 50b and fourth magnetic element 76b exert an attractive magnetic force therebetween. The sum of the magnetic force between first magnetic element 50a and third magnetic element 76a and second magnetic element 50b and fourth magnetic element 76b are of sufficient magnitude to overcome the forces of first leaf spring 72a, second leaf spring 72c, and the insertion force between first electrical connector 48 and second electrical connector 58. As a result, first alignment pin 56a, second alignment pin 56b, and second electrical connector 58 are pulled into the extended position so that they are able to couple with first alignment pin receptacle 46a, second alignment pin receptacle 46b, and first electrical connector 48, respectively, of device housing 12. Electronic device 40 may then be operated in the docked mode of operation.

During undocking of device housing 42 from base housing 54, first magnetic element 50a and second magnetic element 50b of device housing 42 are moved away from third magnetic element 76a and fourth magnetic element 76b and the sum of the magnetic force between first magnetic element 50a and third magnetic element 76a and second magnetic element 50b and fourth magnetic element 76b are weakened to an extent such that they are overcome by the forces of first leaf spring 72a and second leaf spring 72c. As a result, first alignment pin 56a, second alignment pin 56b, and second electrical connector 58 are pulled into base housing 54.

Figure 5A:
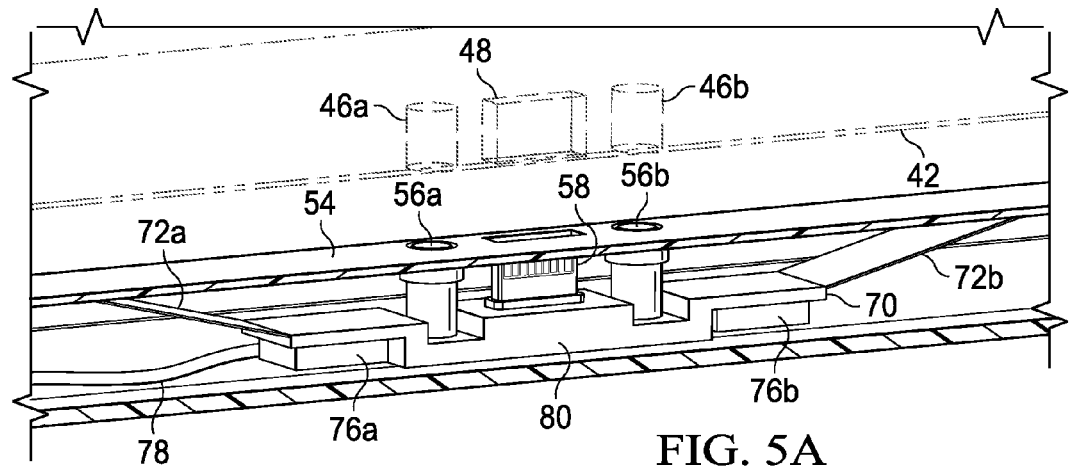
FIGS. 5A-5C are simplified close-up diagrams of a docking procedure between the electronic device and the docking base.
Figure 5B:
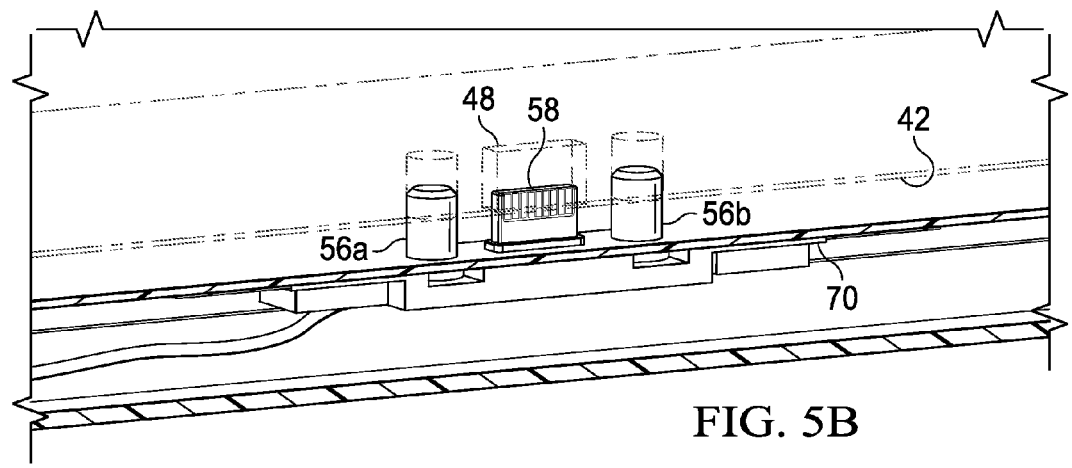
Figure 5C:
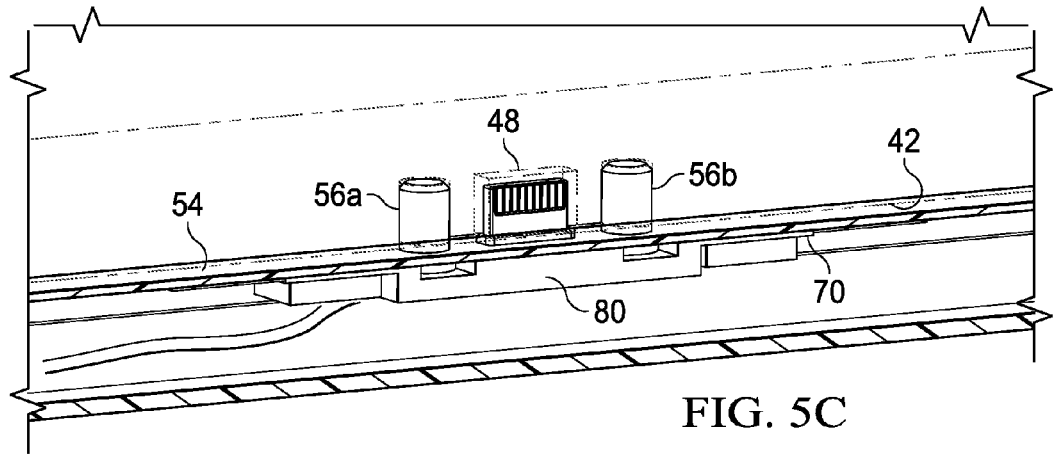

FIGS. 5A-5C are simplified close-up diagrams of a docking procedure between electronic device 40 and docking base 52. In FIG. 5A, electronic device 40 is shown as detached from docking base 52 and first alignment pin 56a, second alignment pin 56b, and second electrical connector 58 are hidden within base housing 54. In FIG. 5B, electronic device 40 is shown as in the process of being docked with docking base 52. As electronic device 40 is brought within proximity of docking base 52, first alignment pin 56a, second alignment pin 56b, and second electrical connector 58 are in the process of being pulled into an extended position from base housing 54 by the magnetic attraction between the magnetic elements 50a-50b (not shown) of electronic device 40 and magnetic elements 76a-76b of base housing 54 being sufficient to overcome the force of leaf springs 72a-72b and connector insertion force. In FIG. 5C, electronic device 40 is shown as being docked with docking base 52 in which first alignment pin 56a is docked with first alignment pin receptacle 46a, second alignment pin 56b is docked with second alignment pin receptacle 46b, and second electrical connector 58 is docked with first electrical connector 48. If electronic device 40 is later detached from docking base 42, first alignment pin 56a, second alignment pin 56b, and second electrical connector 58 are retracted into base housing 54.

Figure 6:
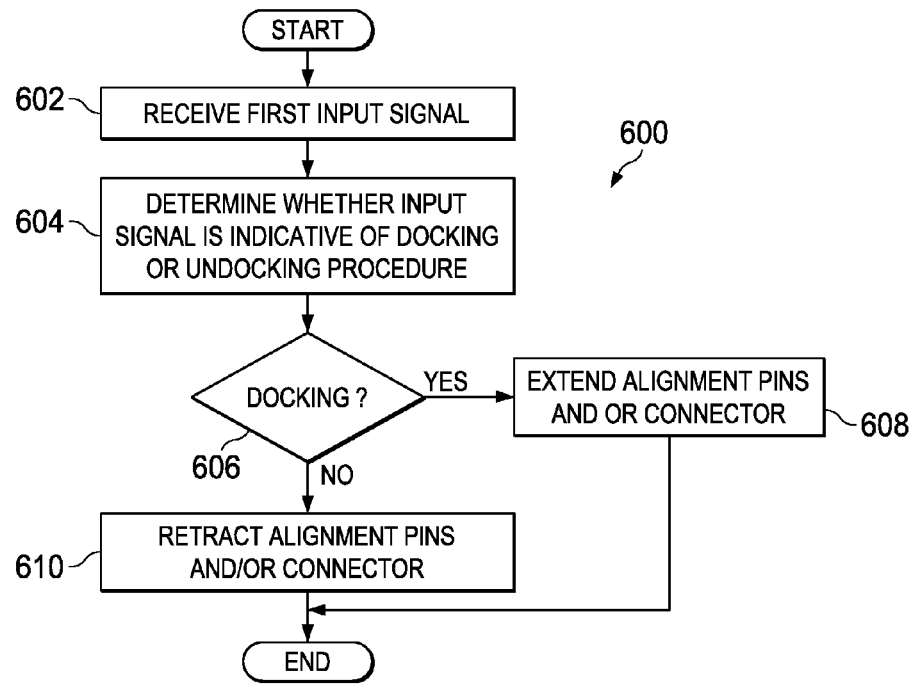
FIG. 6 is a simplified flow diagram illustrating potential operations for an electronic device in accordance with one embodiment of the present disclosure.

FIG. 6 is a simplified flow diagram illustrating potential operations for an electronic device in accordance with one embodiment of the present disclosure. In 602, control module 212 receives a first input signal indicative of either a request for docked operation or undocked operation of electronic device 10. In a particular embodiment, the first input signal is a proximity signal from proximity sensor 218. In another particular embodiment, the first input signal is a user input such as a switch input, a touch input on a display screen, or a gesture indicative of either a docking procedure or an undocking procedure of electronic device 10. In 604, control module 212 determines whether the input signal is indicative of a docking procedure or undocking procedure. In 606, if the input signal is determined to be indicative of a docking procedure, the operations continue to 608. In 608, control module 212 sends a control signal to cause one or more of alignment pins and/or a connector of docking base 20 to be extended from base housing 22 and the operations end. In 608, if the input signal is indicative of an undocking procedure, the operations continue to 610. In 610, control module 212 sends a control signal to cause one or more of alignment pins and/or a connector of docking base 20 to be retracted into base housing 22 and the operations end.

Figure 7:
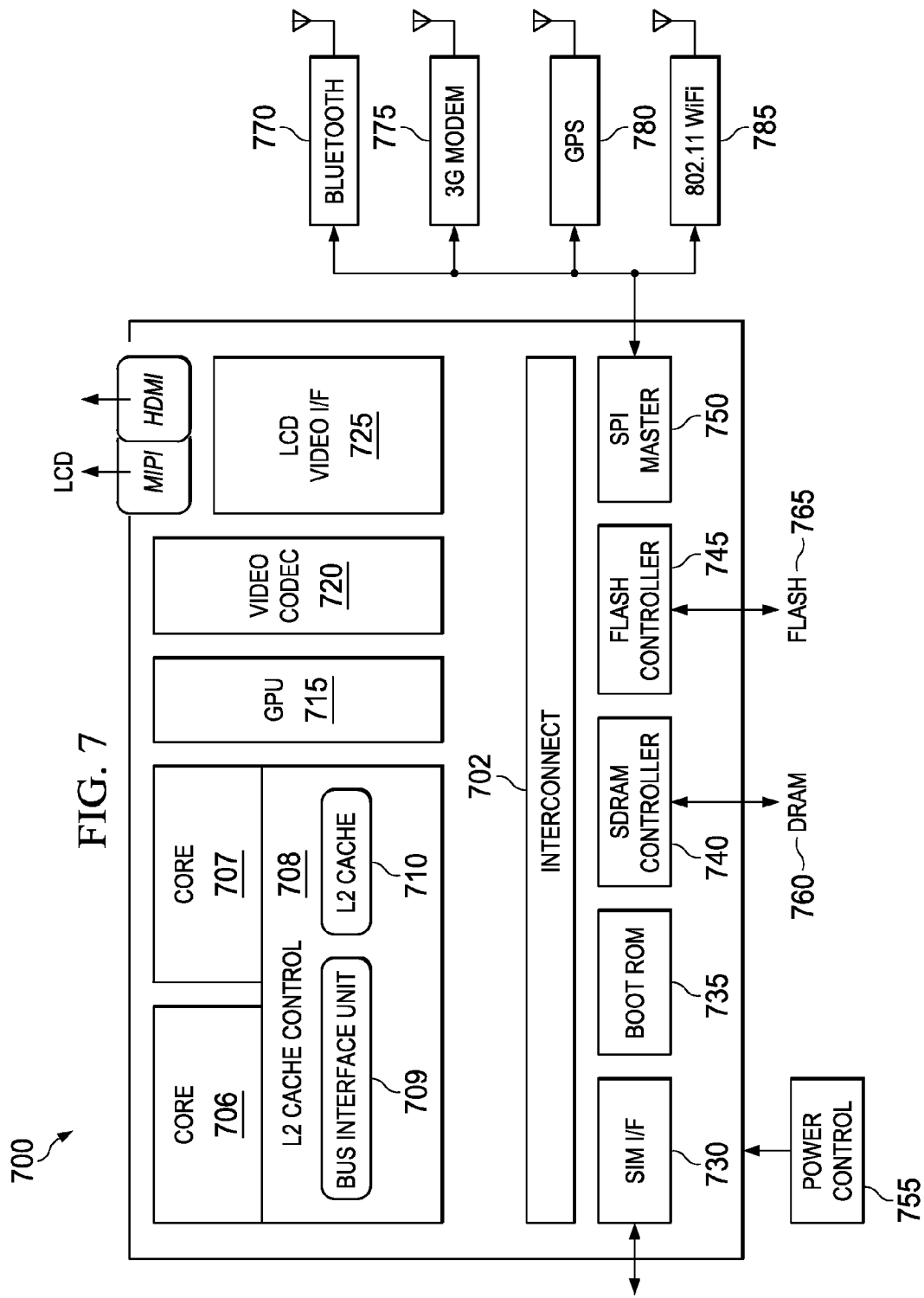
FIG. 7 is a simplified block diagram associated with an example ARM ecosystem system on chip (SOC) of the present disclosure.

FIG. 7 is a simplified block diagram associated with an example ARM ecosystem SOC 700 of the present disclosure. At least one example implementation of the present disclosure can include the detachable unit features discussed herein and an ARM component. For example, the example of FIG. 7 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LDC.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiment include one or more communication capabilities, interfaces, and features such as instances of Bluetooth™ 770, a 3G modem 775, a global positioning system (GPS) 780, and an 802.11 WiFi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
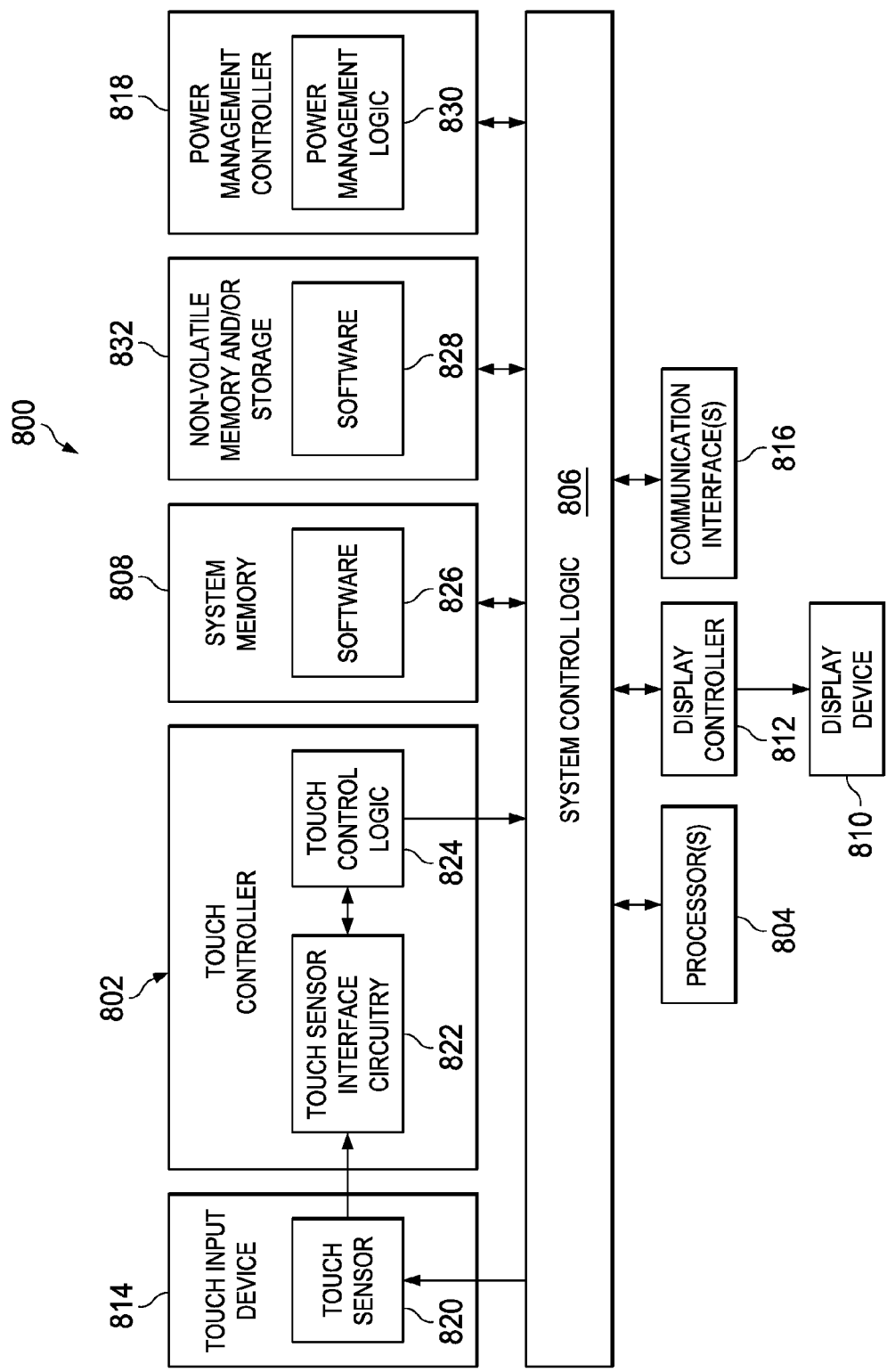
FIG. 8 is a simplified block diagram illustrating example logic that may be used to execute activities associated with the present disclosure.

FIG. 8 is a simplified block diagram illustrating potential electronics and logic that may be associated with electronic device 10 or 40 discussed herein. In at least one example embodiment, system 800 can include a touch controller 802, one or more processors 804, system control logic 806 coupled to at least one of processor(s) 804, system memory 808 coupled to system control logic 806, non-volatile memory and/or storage device(s) 832 coupled to system control logic 806, display controller 812 coupled to system control logic 806, display controller 812 coupled to a display device 810, power management controller 818 coupled to system control logic 806, and/or communication interfaces 816 coupled to system control logic 806.

Hence, the basic building blocks of any computer system (e.g., processor, memory, I/O, display, etc.) can be used in conjunction with the teachings of the present disclosure. Certain components could be discrete or integrated into a System on Chip (SoC). Some general system implementations can include certain types of form factors in which system 800 is part of a more generalized enclosure. In alternate implementations, instead of notebook device/laptops, etc., certain alternate embodiments deal with mobile phones, tablet devices, etc.

System control logic 806, in at least one embodiment, can include any suitable interface controllers to provide for any suitable interface to at least one processor 804 and/or to any suitable device or component in communication with system control logic 806. System control logic 806, in at least one embodiment, can include one or more memory controllers to provide an interface to system memory 808. System memory 808 may be used to load and store data and/or instructions, for example, for system 800. System memory 808, in at least one embodiment, can include any suitable volatile memory, such as suitable dynamic random access memory (DRAM) for example. System control logic 806, in at least one embodiment, can include one or more I/O controllers to provide an interface to display device 810, touch controller 802, and non-volatile memory and/or storage device(s) 832.

Non-volatile memory and/or storage device(s) 832 may be used to store data and/or instructions, for example within software 828. Non-volatile memory and/or storage device(s) 832 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 818 may include power management logic 830 configured to control various power management and/or power saving functions. In at least one example embodiment, power management controller 818 is configured to reduce the power consumption of components or devices of system 800 that may either be operated at reduced power or turned off when the electronic device is in a closed configuration. For example, in at least one embodiment, when the electronic device is in a closed configuration, power management controller 818 performs one or more of the following: power down the unused portion of the display and/or any backlight associated therewith; allow one or more of processor(s) 804 to go to a lower power state if less computing power is required in the closed configuration; and shutdown any devices and/or components that are unused when an electronic device is in the closed configuration.

Communications interface(s) 816 may provide an interface for system 800 to communicate over one or more networks and/or with any other suitable device. Communications interface(s) 816 may include any suitable hardware and/or firmware. Communications interface(s) 816, in at least one example embodiment, may include, for example, a network adapter, a wireless network adapter, a telephone modem, and/or a wireless modem. System control logic 806, in at least one embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 804 may be packaged together with logic for one or more controllers of system control logic 806. In at least one embodiment, at least one processor 804 may be packaged together with logic for one or more controllers of system control logic 806 to form a System in Package (SiP). In at least one embodiment, at least one processor 804 may be integrated on the same die with logic for one or more controllers of system control logic 806. For at least one embodiment, at least one processor 804 may be integrated on the same die with logic for one or more controllers of system control logic 806 to form a System on Chip (SoC).

For touch control, touch controller 802 may include touch sensor interface circuitry 822 and touch control logic 824. Touch sensor interface circuitry 822 may be coupled to detect touch input over a first touch surface layer and a second touch surface layer of a display (i.e., display device 810). Touch sensor interface circuitry 822 may include any suitable circuitry that may depend, for example, at least in part on the touch-sensitive technology used for a touch input device. Touch sensor interface circuitry 822, in one embodiment, may support any suitable multi-touch technology. Touch sensor interface circuitry 822, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 824 may be coupled to help control touch sensor interface circuitry 822 in any suitable manner to detect touch input over a first touch surface layer and a second touch surface layer. Touch control logic 824 for at least one example embodiment may also be coupled to output in any suitable manner digital touch input data corresponding to touch input detected by touch sensor interface circuitry 822. Touch control logic 824 may be implemented using any suitable logic, including any suitable hardware, firmware, and/or software logic (e.g., non-transitory tangible media), that may depend, for example, at least in part on the circuitry used for touch sensor interface circuitry 822. Touch control logic 824 for at least one embodiment may support any suitable multi-touch technology.

Touch control logic 824 may be coupled to output digital touch input data to system control logic 806 and/or at least one processor 804 for processing. At least one processor 804 for at least one embodiment may execute any suitable software to process digital touch input data output from touch control logic 824. Suitable software may include, for example, any suitable driver software and/or any suitable application software. As illustrated in FIG. 8, system memory 808 may store suitable software 826 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

Although various embodiments are described herein related to an electronic device being docked with a docking base, it should be understood that the principles described herein may be applied to any domain in which a mechanical alignment mechanism between two devices is desired. For example, one or more embodiments may be directed to an automotive domain in which docking between a tablet a vehicle mounted device is desired. Further, although various embodiments are illustrated as having alignment pins and/or a connector as the only mechanical attachment mechanism between the electronic device and the docking base, it should be understood that in other embodiments additional magnetic or non-magnetic attachment mechanisms (such as latches, etc.) may be used to secure the electronic device to the docking base.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

The following examples pertain to embodiments in accordance with this Specification. Note that all optional features of the apparatuses and systems described above may also be implemented with respect to the method or process described herein and specifics in the examples may be used anywhere in one or more embodiments.

Example 1 is a docking base, comprising: a base housing including: at least one alignment pin disposed within the base housing, each of the at least one alignment pin being configured to engage a corresponding alignment pin receptacle of a device housing of an electronic device; and an attachment mechanism coupled to the at least one first alignment pin, wherein the attachment mechanism is configured to cause the at least one first alignment pin to extend at least partially from the base housing when the device housing is within a predetermined proximity of the base housing.

In Example 2, the subject matter of Example 1 can optionally include wherein the attachment mechanism is further configured to retract the at least one alignment pin within the base housing when the device housing is not within the predetermined proximity of the base housing.

In Example 3, the subject matter of Examples 1-2 can optionally include wherein the device housing further includes at least one first magnetic element disposed proximate to at least one alignment pin receptacle, the at least one first magnetic element configured to magnetically attract the at least one alignment pin and move the at least one alignment pin into the extended position to engage with the corresponding alignment pin receptacle when the device housing is within a predetermined proximity of the base housing.

In Example 4, the subject matter of Examples 1-3 can optionally include wherein the base housing further includes at least one second magnetic element disposed proximate to the at least one alignment pin, the at least one second magnetic element configured to magnetically attract the at least one alignment pin to facilitate retracting of the at least one alignment pin within the base housing when the device housing is not within the predetermined proximity of the base housing.

In Example 5, the subject matter of Examples 1-3 can optionally include wherein the base housing further includes at least one movable magnetic element coupled to the at least one alignment pin; and a control module in communication with the at least one movable element, wherein the control module is configured to receive an input signal indicative of a current operating context of the electronic device, determine whether the at least one alignment pin is to be extended or retracted from the base housing based upon the current operating context, and cause the at least one movable magnetic element to either extend or retract the at least one alignment pin based upon the determined current operating context.

In Example 6, the subject matter of Example 5 can optionally include wherein the control module is further configured to cause the at least one movable magnetic element to extend the at least one alignment pin from the base housing when the current operating context is indicative of a docking operation of the device housing with the base housing.

In Example 7, the subject matter of Example 6 can optionally include wherein the base housing further comprises at least one third magnetic element in communication with the control module, wherein the control module is further configured to cause the at least one third magnetic element to magnetically attract the device housing when the current operating context is indicative of the docking operation of the device housing with the base housing.

In Example 8, the subject matter of Example 5 can optionally include wherein the control module is further configured to cause the at least one movable magnetic element to retract the at least one alignment pin into the base housing when the current operating context is indicative of an undocking operation of the device housing from the base housing.

In Example 9, the subject matter of Examples 1-3 can optionally include at least one movable magnetic element coupled to the at least one alignment pin; a control module in communication with the at least one movable element; and a proximity sensor in communication with the control module, the proximity sensor configured to detect when the device housing is moved within a predetermined proximity to the base housing.

In Example 10, the subject matter of Example 9 can optionally include wherein the control module is configured to cause the at least one movable magnetic element to extend the at least one alignment pin from the base housing when the device housing is determined to be within the predetermined proximity to the base housing.

In Example 11, the subject matter of Example 9 can optionally include wherein the control module is configured to cause the at least one movable magnetic element to retract the at least one alignment pin into the base housing when the device housing is not determined to be within the predetermined proximity to the base housing.

In Example 12, the subject matter of Examples 1-2 can optionally include wherein the attachment mechanism includes: a support member coupled to the base housing, wherein the at least one alignment pin is coupled to the support member; and at least one fourth magnetic element coupled to the support member, wherein the at least one fourth magnetic element is configured to be magnetically attracted to the device housing to cause the at least one first alignment pin to extend at least partially from the base housing when the device housing is within the predetermined proximity of the base housing.

In Example 13, the subject matter of Example 12 can optionally include a first electrical connector coupled to the support member, wherein the first electrical connector is configured to extend from the base housing and engage a second electrical connector of device housing when the device housing is within a predetermined proximity of the base housing.

In Example 14, the subject matter of Example 12 can optionally include wherein the support housing is coupled to the base housing by at least one spring, wherein the at least one spring is are configured to apply force to bias the support member in a retracted direction.

In Example 15, the subject matter of Example 14 can optionally include wherein the at least one spring is a leaf spring.

Example 16 is a system, comprising: a device housing including at least one alignment pin receptacle; a base housing including: at least one alignment pin disposed within the base housing, each of the at least one alignment pin being configured to engage a corresponding alignment pin receptacle of a device housing; and an attachment mechanism coupled to the at least one first alignment pin, wherein the attachment mechanism is configured to cause the at least one first alignment pin to extend at least partially from the base housing when the device housing is within a predetermined proximity of the base housing.

In Example 17, the subject matter of Example 16 can optionally include wherein the attachment mechanism is further configured to retract the at least one alignment pin within the base housing when the device housing is not within the predetermined proximity of the base housing.

In Example 18, the subject matter of Examples 16-17 can optionally include wherein the device housing further includes at least one first magnetic element disposed proximate to at least one alignment pin receptacle, the at least one first magnetic element configured to magnetically attract the at least one alignment pin and move the at least one alignment pin into the extended position to engage with the corresponding alignment pin receptacle when the device housing is within a predetermined proximity of the base housing.

In Example 19, the subject matter of Examples 16-18 can optionally include wherein the base housing further includes at least one second magnetic element disposed proximate to the at least one alignment pin, the at least one second magnetic element configured to magnetically attract the at least one alignment pin to facilitate retracting of the at least one alignment pin within the base housing when the device housing is not within the predetermined proximity of the base housing.

In Example 20, the subject matter of Examples 16-18 can optionally include wherein the base housing further includes at least one movable magnetic element coupled to the at least one alignment pin; and a control module in communication with the at least one movable element, wherein the control module is configured to receive an input signal indicative of a current operating context of the electronic device, determine whether the at least one alignment pin is to be extended or retracted from the base housing based upon the current operating context, and cause the at least one movable magnetic element to either extend or retract the at least one alignment pin based upon the determined current operating context.

Example 21 is at least one computer readable storage medium comprising instructions, wherein the instructions when executed by at least one processor cause the at least one processor to: receive an input signal indicative of a current operating context of an electronic device; determine whether at least one alignment pin of a base housing is to be extended or retracted from the base housing based upon the current operating context, each of the at least one alignment pin being configured to engage a corresponding alignment pin receptacle of a device housing of the electronic device; and cause at least one movable magnetic element within the base housing to either extend or retract the at least one alignment pin based upon the determined current operating context.

In Example 22, the subject matter of Example 21 can optionally include wherein the processor is further configured to cause the at least one movable magnetic element to extend the at least one alignment pin from the base housing when the current operating context is indicative of a docking operation of the device housing with the base housing.

In Example 23, the subject matter of Examples 21-22 can optionally include wherein the processor is further configured to cause the at least one movable magnetic element to retract the at least one alignment pin into the base housing when the current operating context is indicative of an undocking operation of the device housing from the base housing.

In Example 24, the subject matter of Example 21 can optionally include wherein the processor is further configured to: determine when the device housing is moved within a predetermined proximity to the base housing; and cause the at least one movable magnetic element to extend the at least one alignment pin from the base housing when the device housing is determined to be within the predetermined proximity to the base housing.

In Example 25, the subject matter of Example 21 can optionally include wherein the processor is further configured to: determine when the device housing is moved within a predetermined proximity to the base housing; and cause the at least one movable magnetic element to retract the at least one alignment pin into the base housing when the device housing is not determined to be within the predetermined proximity to the base housing.

Example 26 is a method comprising: receiving an input signal indicative of a current operating context of an electronic device; determining whether at least one alignment pin of a base housing is to be extended or retracted from the base housing based upon the current operating context, each of the at least one alignment pin being configured to engage a corresponding alignment pin receptacle of a device housing of the electronic device; and causing at least one movable magnetic element within the base housing to either extend or retract the at least one alignment pin based upon the determined current operating context.

In Example 27, the subject matter of Examples 26 can optionally include causing the at least one movable magnetic element to extend the at least one alignment pin from the base housing when the current operating context is indicative of a docking operation of the device housing with the base housing.

In Example 28, the subject matter of Example 26 can optionally include causing the at least one movable magnetic element to retract the at least one alignment pin into the base housing when the current operating context is indicative of an undocking operation of the device housing from the base housing.

In Example 29, the subject matter of Example 26 can optionally include determining when the device housing is moved within a predetermined proximity to the base housing; and causing the at least one movable magnetic element to extend the at least one alignment pin from the base housing when the device housing is determined to be within the predetermined proximity to the base housing.

In Example 30, the subject matter of Example 26 can optionally include determining when the device housing is moved within a predetermined proximity to the base housing; and causing the at least one movable magnetic element to retract the at least one alignment pin into the base housing when the device housing is not determined to be within the predetermined proximity to the base housing.

Example 31 is an apparatus comprising means for performing the method of any one of Examples 26-30.

In Example 32, the subject matter of Example 31 can optionally include wherein the means for performing the method comprise a processor and a memory.

In Example 33, the subject matter of Example 32 can optionally include wherein the memory comprises machine readable instructions, that when executed cause the apparatus to perform the method of any one of claims 33-36.

In Example 34, the subject matter of Examples 31-33 can optionally include wherein the apparatus is a computing system.

Example 35 is at least one computer readable medium comprising instructions that, when executed, implement a method or realize an apparatus as claimed in any one of Examples 26-34.

Example 36 is an apparatus comprising: means for receiving an input signal indicative of a current operating context of an electronic device; means for determining whether at least one alignment pin of a base housing is to be extended or retracted from the base housing based upon the current operating context, each of the at least one alignment pin being configured to engage a corresponding alignment pin receptacle of a device housing of the electronic device; and means for causing at least one movable magnetic element within the base housing to either extend or retract the at least one alignment pin based upon the determined current operating context.

In Example 37, the subject matter of Example 36 can optionally include means for causing the at least one movable magnetic element to extend the at least one alignment pin from the base housing when the current operating context is indicative of a docking operation of the device housing with the base housing.

In Example 38, the subject matter of Example 36 can optionally include means for causing the at least one movable magnetic element to retract the at least one alignment pin into the base housing when the current operating context is indicative of an undocking operation of the device housing from the base housing.

In Example 39, the subject matter of Example 36 can optionally include means for determining when the device housing is moved within a predetermined proximity to the base housing; and means for causing the at least one movable magnetic element to extend the at least one alignment pin from the base housing when the device housing is determined to be within the predetermined proximity to the base housing.

In Example 40, the subject matter of Example 36 can optionally include means for determining when the device housing is moved within a predetermined proximity to the base housing; and means for causing the at least one movable magnetic element to retract the at least one alignment pin into the base housing when the device housing is not determined to be within the predetermined proximity to the base housing.

What is claimed is:

1. A docking base, comprising:
   a base housing including:
   a first alignment pin and a second alignment pin disposed entirely within the base housing when in a retracted position, each of the first alignment pin and the second alignment pin being configured to engage a corresponding first alignment pin receptacle and second alignment pin receptacle, respectively, of a device housing of an electronic device when in an extended position;
   a first electrical connector disposed entirely within the base housing when in the retracted position, the first electrical connector configured to engage a second electrical connector of the device housing when in the extended position; and
   an attachment mechanism including a support member coupled to the base housing, wherein the support member is further coupled to the first alignment pin, the second alignment pin, and the first electrical connector, wherein the support member is configured to cause the first alignment pin, the second alignment pin, and the first electrical connector to extend at least partially from the base housing into the extended position substantially simultaneously when the device housing is within a predetermined proximity of the base housing; and
   wherein the attachment mechanism further includes:
   at least one magnetic element coupled to the support member, wherein the at least one magnetic element is configured to be magnetically attracted to the device housing to cause the first alignment pin to extend at least partially from the base housing when the device housing is within the predetermined proximity of the base housing.

2. The docking base of claim 1, wherein the attachment mechanism is further configured to retract the first alignment pin, the second alignment pin, and the first electrical connector into the retracted position within the base housing when the device housing is not within the predetermined proximity of the base housing.

3. The docking base of claim 1, wherein the device housing further includes at least one first magnetic element disposed proximate to at least one of the first alignment pin receptacle and the second alignment pin receptacle, the at least one first magnetic element configured to magnetically attract the at least one of the first alignment pin and the second alignment pin and move the at least one of the first alignment pin and the second alignment pin into the extended position to engage with the corresponding one of the first alignment pin receptacle and the second alignment pin receptacle when the device housing is within a predetermined proximity of the base housing.

4. The docking base of claim 3, wherein the at least one magnetic element includes at least one second magnetic element disposed proximate to at least one of the first alignment pin and the second alignment pin, the at least one second magnetic element configured to magnetically attract the at least one of the first alignment pin and the second alignment pin to facilitate retracting of the at least one of the first alignment pin and the second alignment pin within the base housing in the retracted position when the device housing is not within the predetermined proximity of the base housing.

5. The docking base of claim 4, wherein the base housing further comprises at least one third magnetic element in communication with the control module, wherein the control module is further configured to cause the at least one third magnetic element to magnetically attract the device housing when the current operating context is indicative of the docking operation of the device housing with the base housing.

6. The docking base of claim 1, wherein the base housing further includes:
   at least one first movable magnetic element coupled to at least one of the first alignment pin and the second alignment pin; and
   a control module in communication with the at least one movable element, wherein the control module is configured to receive an input signal indicative of a current operating context of the electronic device, determine whether the at least one of the first alignment pin and the second alignment pin is to be extended or retracted from the base housing based upon the current operating context, and cause the at least one first movable magnetic element to either extend or retract the at least one of the first alignment pin and the second alignment pin based upon the determined current operating context.

7. The docking base of claim 6, wherein the control module is further configured to cause the at least one first movable magnetic element to extend the at least one of the first alignment pin and the second alignment pin from the base housing when the current operating context is indicative of a docking operation of the device housing with the base housing.

8. The docking base of claim 6, wherein the control module is further configured to cause the at least one first movable magnetic element to retract the at least one of the first alignment pin and the second alignment pin into the base housing when the current operating context is indicative of an undocking operation of the device housing from the base housing.

9. The docking base of claim 1, further comprising:
   at least one movable magnetic element coupled to at least one of the first alignment pin and the second alignment pin;
   a control module in communication with the at least one movable element; and
   a proximity sensor in communication with the control module, the proximity sensor configured to detect when the device housing is moved within a predetermined proximity to the base housing.

10. The docking base of claim 9, wherein the control module is configured to cause the at least one movable magnetic element to extend the at least one of the first alignment pin and the second alignment pin from the base housing when the device housing is determined to be within the predetermined proximity to the base housing.

11. The docking base of claim 9, wherein the control module is configured to cause the at least one movable magnetic element to retract the at least one of the first alignment pin and the second alignment pin into the base housing when the device housing is not determined to be within the predetermined proximity to the base housing.

12. The docking base of claim 1, wherein the support member is coupled to the base housing by at least one spring, wherein the at least one spring is configured to apply force to bias the support member in a retracted direction.

13. The docking base of claim 12, wherein the at least one spring is a leaf spring.

14. A system, comprising:
    a device housing including a first alignment pin receptacle and a second alignment pin receptacle;
    a base housing including:
        a first alignment pin and a second alignment pin disposed entirely within the base housing when in a retracted position, each of the first alignment pin and the second alignment pin being configured to engage a corresponding first alignment pin receptacle and second alignment pin receptacle, respectively, of a device housing of an electronic device when in an extended position;
        a first electrical connector disposed entirely within the base housing when in the retracted position, the first electrical connector configured to engage a second electrical connector of the device housing when in the extended position; and
        an attachment mechanism including a support member coupled to the base housing, wherein the support member is further coupled to the first alignment pin, the second alignment pin, and the first electrical connector, wherein the support member is configured to cause the first alignment pin, the second alignment pin, and the first electrical connector to extend at least partially from the base housing into the extended position substantially simultaneously when the device housing is within a predetermined proximity of the base housing; and
        wherein the attachment mechanism further includes:
        at least one magnetic element coupled to the support member, wherein the at least one magnetic element is configured to be magnetically attracted to the device housing to cause the first alignment pin to extend at least partially from the base housing when the device housing is within the predetermined proximity of the base housing.

15. The system of claim 14, wherein the attachment mechanism is further configured to retract the first alignment pin, the second alignment pin, and the first electrical connector into the retracted position within the base housing when the device housing is not within the predetermined proximity of the base housing.

16. The system of claim 14, wherein the device housing further includes at least one first magnetic element disposed proximate to at least one of the first alignment pin receptacle and the second alignment pin receptacle, the at least one first magnetic element configured to magnetically attract the at least one of the first alignment pin and the second alignment pin and move the at least one of the first alignment pin and the second alignment pin into the extended position to engage with the corresponding one of the first alignment pin receptacle and the second alignment pin receptacle when the device housing is within a predetermined proximity of the base housing.

17. The system of claim 14, wherein the at least one magnetic element includes at least one second magnetic element disposed proximate to at least one of the first alignment pin and the second alignment pin, the at least one second magnetic element configured to magnetically attract the at least one of the first alignment pin and the second alignment pin to facilitate retracting of the at least one of the first alignment pin and the second alignment pin within the base housing in the retracted position when the device housing is not within the predetermined proximity of the base housing.

18. The system of claim 14, wherein the base housing further includes:
    at least one movable magnetic element coupled to at least one of the first alignment pin and the second alignment pin; and
    a control module in communication with the at least one movable element, wherein the control module is configured to receive an input signal indicative of a current operating context of the electronic device, determine whether at least one of the first alignment pin and the second alignment pin is to be extended or retracted from the base housing based upon the current operating context, and cause the at least one movable magnetic element to either extend or retract the at least one of the first alignment pin and the second alignment pin based upon the determined current operating context.

* * * * *